(12) United States Patent (10) Patent No.: US 12,026,079 B2
Murphy et al. (45) Date of Patent: Jul. 2, 2024

(54) INDUCTIVE METHODS OF DATA VALIDATION FOR DIGITAL SIMULATED TWINNING THROUGH SUPERVISED THEN UNSUPERVISED MACHINE LEARNING AND ARTIFICIAL INTELLIGENCE FROM AGGREGATED DATA

(71) Applicant: Delphi Technologies, Wilmington, DE (US)

(72) Inventors: Melissa E. Murphy, Weehawken, NJ (US); Terhan Yong, Woodside, NY (US); Richard L Peterson, II, Brewster, NY (US)

(73) Assignee: Delphi Technologies, Wilmington, DE (US)

( * ) Notice: Subject to any disclaimer, the term of this patent is extended or adjusted under 35 U.S.C. 154(b) by 65 days.

(21) Appl. No.: 17/884,989

(22) Filed: Aug. 10, 2022

(65) Prior Publication Data

US 2024/0054062 A1 Feb. 15, 2024

(51) Int. Cl.
*G06F 9/44* (2018.01)
*G06F 11/30* (2006.01)
(Continued)

(52) U.S. Cl.
CPC ...... *G06F 11/3438* (2013.01); *G06F 11/3051* (2013.01); *G06F 16/908* (2019.01)

(58) Field of Classification Search
None
See application file for complete search history.

(56) References Cited

U.S. PATENT DOCUMENTS 9,639,341 B2 5/2017 Freiter et al.
10,564,993 B2 2/2020 Deutsch et al.
(Continued)

FOREIGN PATENT DOCUMENTS

| CN | 112801840 A | 5/2021 |
| NO | 345180 B1 | 10/2020 |
| WO | 2022025634 A1 | 2/2022 |

OTHER PUBLICATIONS

International Search Report and Written Opinion issued on Nov. 13, 2023, in corresponding International Application No. PCT/US2023/29951, 7 pages.

*Primary Examiner* — Qamrun Nahar
(74) *Attorney, Agent, or Firm* — Maier & Maier, PLLC

(57) ABSTRACT

An exemplary embodiment may provide a process for providing digital twins by parsing a dataset into a tabulated format and forming multiple silos from the dataset. The silos may include relational databases related to the digital twins. Personas may be formed as algorithms which specialize in a particular silo. An exemplary embodiment may be agnostic to the specific application and/or domain specific. Advanced cron jobs may feed digital twins ("personas") that autonomously adjust behavior based on search criteria-specialization and synthesized analysis of both inputs and outputs. Exemplary personas may be constructed with machine learning, artificial intelligence, stored procedures, and unique specialized databasing to generate reporting, modify data, and socialize with other personas in agreed upon spaces to create control within a three-dimensional world in IoT networks.

20 Claims, 10 Drawing Sheets

(51) Int. Cl.
*G06F 11/34* (2006.01)
*G06F 16/908* (2019.01)

(56) References Cited

U.S. PATENT DOCUMENTS

| | | | |
|---|---|---|---|
| 11,087,890 B2* | 8/2021 | Turrin | G16Y 40/35 |
| 11,176,290 B1* | 11/2021 | Leng | G05B 19/4184 |
| 11,200,045 B1* | 12/2021 | Moyal | G06F 11/3442 |
| 2019/0354922 A1 | 11/2019 | Berti et al. | |
| 2020/0250683 A1 | 8/2020 | Padmanabhan et al. | |
| 2021/0264332 A1* | 8/2021 | Pingali | G06N 5/022 |
| 2021/0342836 A1* | 11/2021 | Cella | G06N 3/006 |
| 2022/0036302 A1* | 2/2022 | Cella | G06N 5/022 |

* cited by examiner

INDUCTIVE METHODS OF DATA VALIDATION FOR DIGITAL SIMULATED TWINNING THROUGH SUPERVISED THEN UNSUPERVISED MACHINE LEARNING AND ARTIFICIAL INTELLIGENCE FROM AGGREGATED DATA

FIELD

An exemplary embodiment relates to the field of network vulnerability management and particularly digital twin enabled asset management.

BACKGROUND

"Big Data" processing techniques have increasingly allowed for improved analysis of large, complex data sets, allowing "Big Data" processors to reveal new patterns, trends, and associations relating to human behavior and interactions that may otherwise have been obscured or beneath notice. "Big Data" processing, generally, has been likened to the collection of "digital dust" in this regard; just as a person traveling from place to place in the physical world might leave behind dead skin cells or other waste matter too small to be seen with the naked eye (but which nonetheless contains their DNA), a person performing various activities on the Internet or on another network might leave behind "digital dust," individually indiscernibly small traces created as an unstructured data byproduct of online activities, as a vulnerability or set of vulnerabilities on one or more applications, or derived from technology users, that nonetheless contain some form of digital footprint for one or more people. This information, collectively, can be assimilated, analyzed, and crafted into a digital proxy of an actual individual, for various purposes like providing insight into the habits of consumers. This growing trail of "digital dust" information that may be left behind as individuals interact with some form of connected device, take electronic actions, or make electronic communications that can in some form or fashion be traced back to an individual, has also been called "data exhaust" or "digital exhaust," or, more loosely, "unconventional data," and may include a variety of interactive, network, linkage, and device data. In a conventional browsing context, this "digital exhaust" might include anything from a set of all of a person's visited websites, clicked links, mouse behavior, cookies, temporary files, logfiles, storable choices, or any other similar activity.

The increasing proliferation of smart devices has meant increasing proliferation of new sources and forms of "digital dust," all of which may be susceptible to "Big Data" analysis. The majority of smart devices, from various handheld information appliances like smartphones to various larger network-enabled systems (vehicles, household appliances, building systems, and so forth), act to continuously provide sensor data which either includes mobile-location data or from which location data can be derived (in the case of a fixed system). When combined with the data ecosystem and with Big Data computing, the use of digital dust derived from these systems may allow various forms of information about individuals to be identified in real-time. This can include both information deliberately collected by the devices (which can include things like directly-connected sensor information as well as other personal identifying information, even including inputs like user typing behavior) as well as information which may be derived from one or more vulnerabilities within the devices. For example, it may be noted that all connected devices contain miniscule manufacturing errors in the calibration of their microelectromechanical components, like accelerometers, gyroscopes, and GPS, that can be used to identify a given device and its user. Many sources of digital exhaust may be directly within a user's control (for example, application permissions on a device), but many others are not, and may be collected regardless of user action, or unless the user deliberately changes their physical behavior (e.g. intentionally typing with a different pattern or style, walking with a different gait, and so forth). Sources within users' control can include user-generated and mobile-specific data, while those outside users' control can include data generated by passive tracking, social networks, authoritative sources, and physical collections.

To give an example, a person may be detected by an intelligent surveillance camera equipped with facial recognition technology as they pass by a physical location, together with other people. The camera data may be paired with social media profiles in order to identify each of the people in the camera shot, and this in turn may be combined with information that may be stored by aggregators individually for each person. At a baseline, the recognition of each individual person in public may allow for construction of a digital dossier of the life of each member of the group, which can be called on-demand whenever that person's face is recognized. Seeing each member of the group in proximity to one another may allow for further application of this digital dossier; for example, in one potential application, phishing messages may be specifically targeted at one of the members of this group with header information seemingly originating from another member of the group, even if the group members had not corresponded by email or by whatever messaging medium the messages would be provided in. (Such messages could likewise be improved by incorporating various details constructed from the digital dossiers of each member. For example, a given phishing message that incorporates location information as well as digital dossier information for each member of a group witnessed together might be "Hey Bob, I really enjoyed our outing to that restaurant last Monday, but I think somebody stole my credit card information while I was there. I canceled the card, but need to purchase [X]. Could I ask you to do that for me? I promise to pay you back!") There are, of course, many other potential malicious applications of having a digital dossier of someone's life that can be called on-demand and which can integrate substantial information about all of the person's ongoing activities, and many more sophisticated malicious actors than mere scammers; in the hands of a governing authority, this capability might allow for the construction of a far more entrenched class-based surveillance society that preys on individualized weaknesses and discriminates based on individualized perceptions.

From a security perspective, these digital trails may help to identify, profile, and predict the behaviors of individuals or groups (often without their awareness), which means that it can be effective to monitor this "digital dust" in the hopes of identifying emerging critical threats that may be revealed by byproducts of online activity. However, this can go both ways, since "digital dust" is emitted by everyone participating in the data ecosystem, by anyone interacting with a connected device, not just the emerging critical threats. For example, foreign adversaries are readily capable of conducting the same analysis of the constantly-emitted personal data of members of the United States Government or of critical organizations, or of random American citizens generally.

Likewise, this "digital dust" or "digital exhaust" is being constantly monitored by entities which may not be threats themselves but which may take inadequate measures to protect the analyzed information (effectively prepackaging the unconventional data for any data thief) or which may simply sell the data to an entity that is a threat or adversary, through means ranging from direct auction to foreclosure sales on a bankrupt company holding this data. These immense troves of personal information have been given such colorful names as "databases of ruin" by various security experts (in this case by Paul Ohm, a policy advisor to the Federal Trade Commission). These experts have voiced concerns that, over time, these databases will include new waves of data—for example, data derived from "smart homes" or from various appliances, or location information from commercial sensors—and so become ever more consolidated. It has been seen as only a matter of time before these databases grow to connect every individual to at least one closely guarded secret, which might be a secret about a medical condition, family history, or personal preference, or something else that, if revealed, would lead to serious, concrete, devastating harm.

Commercial entities are often tracking the unstructured data byproduct of online activities, applications vulnerabilities, and information collected from technology users in order to discern valuable insights into the habits of consumers. For example, during everyday life, devices, service providers, and retailers are tracking interactions made by end-users that allow data brokers to construct digital profiles for every end-user. Looking at advertising most specifically, the digital advertising ecosystem is designed to optimize commercial advertising for revenue generation through tailored or targeted advertising. However, the granular user data collected is cheap and readily available, for example allowing foreign threat actors to socially engineer, target, and act upon counterintelligence methods against government assets or other critical assets.

In the geopolitical field, "intelligence" most often refers to the collection of information about targets through various methods such as signal intelligence (SIGINT) and human intelligence (HUMINT). Digital exhaust produced by every internet user around the world has been in some cases considered to have birthed a new sector of intelligence allowing for target surveillance through the advertising ecosystem known as ADINT.

AI is driving increasingly ubiquitous methods of technical surveillance, and innovations like 5G will only exacerbate the power of ADINT through the aggregation of individualized data, IoT, and geolocation. This has created a need, on the part of organizations which might be targeted by these kinds of activities, to better exercise full control of this kind of data as it pertains to their users, now that it is clear that "security through obscurity" cannot be relied upon. There have been various proposals for how this might be accomplished, with potential solutions being to clean up this data or to add new data in such a way that conclusions are likely misleading. It might be contemplated, for example, to try to model activity of nonexistent individuals within the organization in order to provide low-hanging fruit that might be preferentially targeted (allowing threats to be detected by their attempts to target these nonexistent individuals), to try to clone real individuals in order to lay false trails, or to try to extinguish or obfuscate the data traces associated with real individuals in order to make targeting them more difficult. Executing full control of segmented data within the Internet of Things (IoT) is valuable for individuals or organizations seeking to exercise control over the emission, sale, and exposure of their digital exhaust.

Current market solutions most typically use scheduled cron job reporting (or scheduled reporting using another task scheduler program) that is configured to feed into a database with static data and produce continuous reporting only through fixed input and output criteria. Thus, there exists a need in the field for an assessment technology that is both domain specific and agnostic to application. For example, it might be desirable to find a way to improve on existing in-house applications or other link analysis tools, which do not incorporate certain types of information such as mobile location information or make use of specific profiles in a manner that allows for particular use case applications. Beneficially, being able to precisely replicate the digital lenses of potential adversaries will organically push towards accuracy by removing artificial and potentially inaccurate assumptions.

Data and artificial intelligence (AI), while closely intertwined, present distinct risks and challenges. Machine Learning (ML) technology contains supervised and unsupervised learning underpinning many solutions, notably digital advertising. Machine learning technology "learns" through new data, driving adjustments based on the system's performance and resulting decisions to refine the model. Supervised learning has a human guide to teach the algorithm what conclusions or predictions it should develop. In contrast, unsupervised learning allows the algorithm to discover and present hidden structures in the data independently. Relying on purely historical data reveals profound deficiencies a few layers deeper in the problem set. While all data drives the functionality of AI and ML, historical data is inherently flawed, and so overreliance on it can increase inaccuracy. Unsupervised ML can exacerbate systemic inaccuracies rather than facilitating automated decision making. Thus, it is desirable for end-users or controllers to have better real-time control allowing them to be custodians of their data flows more organically.

SUMMARY

According to at least one exemplary embodiment, a method, system and non-transitory computer program product for creating a "digital twin" of a person or group of people may be shown and described. Such a strategy may allow for creating a real-time reconstruction of the digital world in a manner that allows end-users or controllers to feed data to the "twin" as appropriate, automating the digital twin compositions organically. Reporting accuracy evaluation may likewise be automated, and may be provided exponentially in tandem with these other updates as new data reflect outcomes of decisions with the application's real-time data feed. It may, in some exemplary embodiments, be contemplated to provide such capabilities as a standalone system, or alternatively as an extension or modification of an existing solution with similar capabilities or which is capable of collecting similar data.

An exemplary embodiment of a method, system, or product for providing a "digital twin" may include a rules engine configured for continuous reporting and updating of relational databases by ingesting digital dust and deploying web crawlers to create traceability mappings. The traceability mappings can then be used to identify vulnerabilities. An exemplary embodiment may form a digital twin within an autonomous mechanism that empowers organizations with full control of granular end-user digital exhaust. An exemplary algorithm may distinctly assess: (1) accuracy, (2) ability to synthesize, obtain, and emit data, and (3) impact and collinearity of each action or inaction.

In an exemplary embodiment, a method, system, or product for providing a "digital twin" may include four particular technology components in an exemplary architecture. A digital twin management platform may be provided as a first component, and may operate to correlate data corresponding to individuals in the physical world with particular data values stored in a database system. For example, according to an exemplary embodiment, it may be contemplated for each distinct data attribute unique to an individual in the physical world to be tokenized as a Non-Fungible Data Token (NFDT) within a database system. The summation of these NFDTs may form the digital twin, which may represent the integration of all of these tokens into a Personal Non-Fungible Data Token (PNFDT) that provides the non-replicable and intangible multi-dimensional aspects of an individual's life in the physical world.

As a second component, the system may provide an end user application, which may serve to integrate the system with a user device, such as a user iOS or Android mobile device. This may, for example, be used in order to provide inductive data ingestion of data produced by the user device, in such a manner as to provide digital exhaust, internet, and device protection to users of the service. (For example, in an exemplary embodiment, user data produced by the user's engagement with mobile device may be monitored as it is produced, may be compared to the existing personal non-fungible data token calculated for the user, and may be used as the basis for any recommendations based on the user's publication of digital exhaust that may allow for expansion of the scope of the PNFDT.)

As a third component, the system may provide, or may be integrated with, a data trading network, such as an existing high-frequency data trading network on which data is exchanged. In an exemplary embodiment, it may be contemplated to use the system to interact with an existing high-frequency data trading network in connection with a model financial micro-market structure making use of any or all of order book optimization, co-location, and latency arbitrage in order to better optimize automatic bidding on data within the marketplace. Such optimization of bid/ask execution may, potentially, allow for earlier access to leaked or compiled data, which may allow for multi-dimensional digital twin identity reduction to be performed at an earlier stage or more effectively. It may also be contemplated for the system to use integration with this marketplace in order to sell data, for example in order to facilitate sales of user data from the user to digital advertisers, publishers, and other authorized parties. (It may also be contemplated, for example, for the system to sell data for other reasons; for example, it may be contemplated to sell inauthentic data corresponding to a particular user in order to better obfuscate real data that has been associated with the particular user.)

As a fourth component, or as an extension of the data trading network provided as the third component, it may be contemplated for the system to integrate the tokens into the sales side of the marketplace, allowing end users to sell their own personal data via selling non-fungible data tokens and the usage of the same to digital advertisers and publishers, allowing the user to profit while controlling their privacy.

An exemplary embodiment may be agnostic to the specific application and/or domain specific. For example, it may be contemplated for advanced cron jobs to feed digital twins ("Personas") that autonomously adjust behavior based on search criteria-specialization and synthesized analysis of both inputs and outputs. Exemplary personas may be constructed with machine learning, artificial intelligence, stored procedures, and unique specialized databasing to generate reporting, modify data, and socialize with other personas in agreed upon spaces to create control within a three-dimensional world in IoT networks. An exemplary embodiment may provide a real-time, automated, digital clone which can expedite report validation and decision making (for example, modeling purchasing pattern behavior and updating said modeled purchasing pattern behavior in response to a series of expensive purchases in order to alter when a system elects to provide fraudulent charge notifications) which are more easily validated by visually replicating the digital exhaust consumed by threat actors rather than assuming or inferring their interpretation.

An exemplary embodiment may capture the architecture required to protect assets from digital targeting for safety within the physical world while also showing the viability of harnessing ADINT for security through the ability to validate reporting through digital dust and trace.

An exemplary embodiment may capture the continuous output of digital exhaust for benchmarking against reporting or validation of decisions because ADINT and real-time mobile location data of an asset naturally reflect end users' individual behaviors. The quality of reporting may be auditable and directly tied to decisions; for example, in one exemplary embodiment, it might be determined that a given asset is no longer assisting a particular organization while the data shows continued support, by that asset, for their former employer. Modeling behaviors through a digital twin can thus better allow for confirmation of facts without assumptions.

An exemplary embodiment of a method of providing digital twin-based asset management (which may be executed based on programming code provided to a computer to configure it to perform the method) may include a step of receiving, from a user application of a user device associated with a user (such as a user device running a mobile application), a data set, the data set including information derived from the device such as at least one of: one or more details associated with the user received from a user interface of the user application, and one or more records associated with the user retrieved from the user device. The method may then include a step of parsing the data set into a predetermined format, and providing the data set to a data warehouse, the data warehouse communicatively coupled to a plurality of data silos, each data silo associated with a predetermined silo topic. The method may then include a step of sorting a first portion of the data from the dataset into at least one of the plurality of data silos based on a first predetermined silo topic associated with the at least one of the plurality of data silos, and sorting a second portion of the data from the dataset into at least one other of the plurality of data silos based on a second predetermined silo topic associated with the at least one other of the plurality of data silos.

The method may then include providing a plurality of personas, each of the plurality of personas associated with a predetermined persona topic, each of the plurality of personas communicatively coupled with one or more data silos in the plurality of data silos, and identifying, with at least one of the plurality of personas, from the first portion of the data and the second portion of the data, using at least one multi-dimensional clustering technique, at least one data attribute associated with the user; constructing, from the at least one data attribute, at least one non-fungible data token (NFDT) associated with the at least one data attribute; constructing, from the at least one data attribute and at least one other data attribute, a digital twin comprising a personal non-fungible data token (PNFDT) associated with the user; updating a relational database to include the digital twin; and dynamically updating at least one of a data silo in the plurality of data silos or a persona in the plurality of personas based on construction of the digital twin.

In an exemplary embodiment, the at least one multi-dimensional clustering technique may be eigenvector-based spectral clustering. This may include, for example, providing a principal eigenvector comprising a smallest eigenvector generated from a graph including the first portion of the data and the second portion of the data provides a measure of centrality of the graph, and providing a second smallest eigenvector used to partition the graph into clusters.

In an exemplary embodiment, parsing the data set into a predetermined format may include extracting, from each of a plurality of data strings provided in the data set, a plurality of string elements associated with a predetermined set of string element categories; and designating each of the plurality of data strings from which the plurality of string elements are extracted as uniformly consumable data prior to storing the plurality of data strings in the data warehouse.

In an exemplary embodiment, after retrieving the data set and before parsing the data set into the predetermined format, the method may include retaining the data in a data lake comprising a plurality of data sets. This may allow multiple types of data to be integrated; for example, in an exemplary embodiment, the method may include integrating, into the data set, at least two of: first-party input data including at least one of the one or more details associated with the user received from a user interface of the user application, first-party record data including the one or more records associated with the user retrieved from the user device, first-party hardware data comprising one or more hardware scan records retrieved from the user device, and at least one of second-party data and third-party-data.

In an exemplary embodiment where the data set includes the first-party hardware data, the first-party hardware data may include at least one external hardware scan record of a network to which the user device is connected.

In an exemplary embodiment where the data set includes the first-party record data, the first-party record data may include a list of applications running on the user device, with the data warehouse including a list of blacklisted applications (as well as, for example, gray-listed applications).

In an exemplary embodiment, the data warehouse may include a remediation action history including at least one previous state of the user device, including at least one of previous first-party record data and previous first-party hardware data, said remediation action history further including at least one remediation recommendation. The data set may further include at least one of the first-party record data and the first-party hardware data; with the method further constituting providing at least one of: a comparison of the previous first-party record data and the first-party record data, and a comparison of the previous first-party hardware data and the first-party hardware data, and determining whether the at least one remediation recommendation has been complied with.

In an exemplary embodiment, the method may include periodically receiving, from the user application, based on a predetermined schedule, updates to the data set; and triggering updating of the digital twin based on retrieval of the updates to the data set.

In an exemplary embodiment, the method may include associating, with the relational database, an alert (such as an alert that the user has a high possibility of engaging in illegal activity); and triggering the alert and delivering the alert to a predetermined party upon updating of the relational database to include the digital twin (e.g. alerting an operator of the system if the user is identified as having the high possibility of engaging in illegal activity).

In an exemplary embodiment, the method may include presenting at least one of the at least one NFDT and the PNFDT to the user via the user application, and receiving a user authorization; and after receiving the user authorization, accessing a digital marketplace based on the at least one of the at least one NFDT and the PNFDT, and performing at least one transaction. Performing this transaction might be a purchase, with the system attempting to find how expensive it would be to reconstruct the user's profile; the method may include, for example, searching the digital marketplace for information associated with the at least one of the at least one NFDT and the PNFDT; reconstructing, based on records retrieved on the digital marketplace in the at least one transaction, the at least one of the at least one NFDT and the PNFDT, and determining a reconstruction cost; and providing a report comprising the reconstruction cost to the user device. The transaction may also include performing an authorized sale of the user's data, and the method may include presenting the at least one of the at least one NFDT and the PNFDT for sale on the digital marketplace; receiving potential buyer information, and presenting, to the user, on the user interface, a request for authorization; and delaying the transaction until authorization is received.

In an exemplary embodiment, a plurality of NFDTs may be provided in association with the PNFDT and sorted into a plurality of categories, each NFDT in the plurality of NFDTs associated with stored category information. This plurality of categories may include identity characteristics, demographic information, psychographic information, geographic information, and behavioral information. Likewise, the PNFDT may store relationship information, for example storing at least one connection between the PNFDT and at least one other PNFDT maintained in the relational database and associated with at least one other user.

In an exemplary embodiment, the one or more details associated with the user received from a user interface of the user application include "area of concern" information including: an indication of a hazard provided by the user and a location of the hazard provided by the user; with the method further including presenting, on a map supplied to the user interface, the indication and location of the hazard provided by the user and an indication and location of a hazard provided by at least one other user. Such "area of concern" information may, for example, include a set of data points including first party GPS data that may be provided to a master database.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Figure 1:
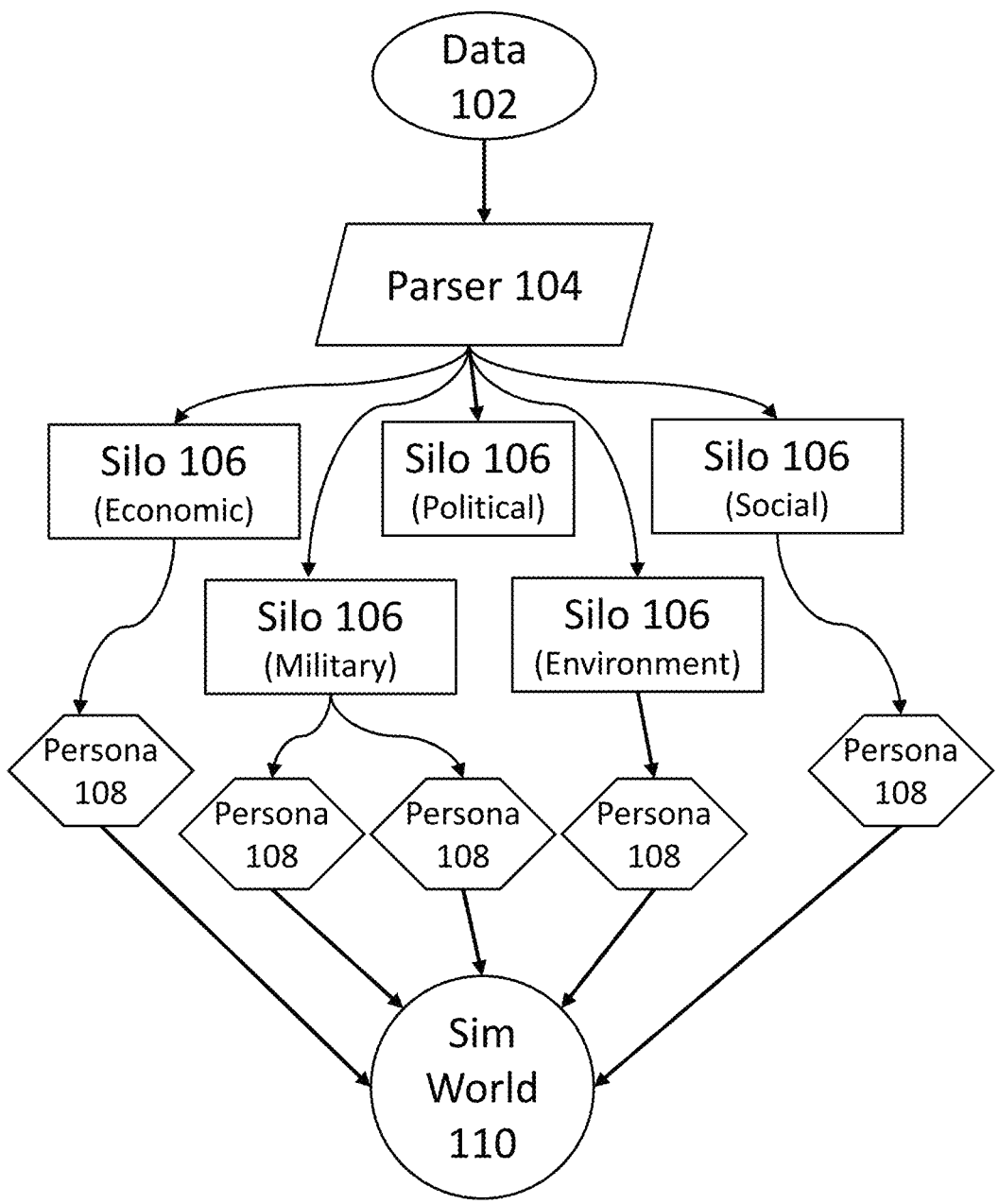
FIG. 1 is an exemplary diagram illustrating the dataflow through an exemplary method.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

According to at least one exemplary embodiment, a method, system and apparatus for identifying vulnerabilities may be shown and described. An exemplary embodiment may include a rules engine configured for continuous reporting and updating of relational databases through one or more collection systems allowing it to harvest and ingest digital dust, which may include, for example, deployment of a plurality of web crawlers to create traceability mappings that can then be used to identify vulnerabilities.

In an exemplary embodiment, it may be contemplated for crawlers provided as a part of the collection system to be programs having computation capabilities which lack persona assessment capabilities. These tools may be configured to search for personally identifiable information (PII) which may be available through any public source, such as name and address information found on a social media profile or in some other registry, which the crawler tools may then send to a static repository. It may particularly be contemplated for crawlers to access any or all of: social media websites or applications, as well as any other listed or unlisted websites potentially hosting PII (such as marketplace websites where a given user may have buyer or seller location information listed). Once the data is collected from the one or more crawlers, it may be used in order to progressively refine traceability mappings, refine digital twin elements, and progressively updating traceability mappings. It may further be contemplated for a collection system to perform initial computations of traceability mappings, for example by eigenvector computation. Such data may then be provided to a parser, allowing traceability mappings derived from the data collected from the crawlers to be used to determine the data type and location to be sent within an internal database, allowing the data to be separated into one or more personas, with logic then applied within the persona computation to determine quality, vulnerability, and pattern detection.

An exemplary embodiment of a system for identifying vulnerabilities may be particularly configured to receive data in the form of an unformatted list of data, for example as provided by the contemplated web crawlers or as received from other sources. Said exemplary embodiment may further include a parser, which may operate to split this data, or any other data that has been received, into a tabulated format; in an exemplary embodiment, data may be fed into the parser as unformatted data and formatting may be applied in the parser, and in another exemplary embodiment data may be preprocessed before being provided to the parser, as desired.

In an exemplary embodiment, parsers may feed data into a plurality of databases referred to as silos, which may represent relational databases for a digitally reconstructed user world identifying fields of expertise (e.g., social, economic, political, military, or environmental) under which an exemplary embodiment may organize personas and data into a relationship database referred to as the sim world. According to an exemplary embodiment, it may be contemplated for each silo to have a structure particularized to one or more personas, such that a first silo structure implemented in one or more silos is associated with a first persona and a second distinct silo structure implemented in one or more silos is associated with a second persona. In an exemplary embodiment, one or more of the silo structures may be constructed or adapted by an artificial intelligence or machine learning system, such as an AI or ML tool operating to govern the system. Various hardware implementations of the silo structure may be contemplated, according to various exemplary embodiments; for example, in a first exemplary embodiment, it may be contemplated to provide each of the silos on a private cloud system, while in a second exemplary embodiment, it may be contemplated to provide any other database implementation, such as based on physical database hardware.

An exemplary embodiment of a system may include a toolchain for streaming between the personas and the sim-world, which may operate to direct data in transit. In an exemplary embodiment, a toolchain may be implemented as a subsystem separate from the databases. it may be contemplated for the toolchain to support inductive data processing, in contrast with personas, which may support both inductive and deductive processing, which may be executed alone or separately.

In an exemplary embodiment, personas may be software algorithms intended to perform specialized processing, while the toolchain may be more general; personas may operate after data is properly directed, operating on silo data in order to detect patterns, refine methods, and generate more accurate digital twin elements. For example, personas may be understood as task-bound algorithms trained to be a single topological data expert, potentially with overlap between personas on certain matters or with interaction between personas being specifically triggered for certain matters, such as may be desired.

According to some exemplary embodiments, personas may be arranged so as to interact with other personas, interact with any or all silos (including silos particularly associated with that persona or having a structure optimized for that persona, as well as silos that are associated with some other persona or which have a structure optimized for use with some other persona), interact with any or all other relational databases, and/or may interact with the totality of the data that has been incorporated into the sim world. According to an exemplary embodiment where a persona is implemented essentially as a task-bound algorithm trained to be a single topological data expert, that persona may act to govern data related to its area of expertise, which means that all other personas may defer to that first persona on that single topological data as it is the expert for it.

It may likewise be contemplated to provide a system in which personas may be entitled to a level of deference that is less than absolute, as opposed to having each persona be exclusively associated with a particular area of expertise and having each persona be given deference within that area of expertise. For example, according to an exemplary embodiment, it may be contemplated to have the sim world be operable to overrule a finding of an individual persona with respect to a single topological data; in an exemplary embodiment, it may only be the sim world which is able to act as a contravening authority in this manner with respect to a single instance of topological data. In an exemplary embodiment, it may be contemplated to provide a different system for matters relating to multiple instances of single topological data, or instances where single topological data does not relate clearly to one particular area of expertise, or where no one persona is operable to act as the subject matter expert on the particular data. For example, according to an exemplary embodiment, it may be contemplated to provide an arrangement where a primary persona operates on a given instance of single topological data, under circumstances where one or more subsystems in a collection of subsystems have a veto power over the decision of the primary persona. This may, for example, be achieved by a vote of multiple personas, which may be operable to override a decision of the unsupervised function of a primary persona or other active system. (Likewise, it may be contemplated for any other subsystems to have this capability, such as the sim world, one or more of the silos, or some combination of the other subsystems; for example, in an exemplary embodiment where a primary persona or other such system is interpreting data from a first silo, it might be contemplated to have the decision of the primary persona be overridden based on the action of a vote of multiple other personas interpreting the data from the first silo.)

An automated persona may output encapsulated programmable reports based on organic data that can be generally applied or reported on a case-by-case basis. (It may, in certain exemplary embodiments, be contemplated to combine this report data with the reports provided or compiled by human analysts, as well; for example, it may be contemplated to provide programmable reports according to a particular standard.) The report may be then relayed against the relationship database associated with the sim world. Conflicts of generated data may be marked and forked into a table for manual review, and a persona may be created or updated to handle future data conflicts. In an exemplary embodiment, the sim world may project a relationship database assembled from silos and personas to compile all data derived and established by data structures.

Referring now to FIG. 1, FIG. 1 may illustrate a schematic flowchart illustrating the dataflow through an exemplary embodiment of an implementation of the system, 100. The initial data 102 may begin as a formatted list of data and may be unsorted. The parser 104 may split the data into a tabulated format. In an exemplary embodiment, a parser 104 may be a collection of a plurality of parsers 104, such as may be desired.

According to an exemplary embodiment, parser(s) 104 may operate to sort and extract incoming data 102 from a specific type of source, such as, for example, data 102 derived from Big Data analysis, data 102 derived directly from recipients (such as, for example, messages sent by a user to those recipients), data 102 derived from photographs (such as, for example, photos posted on social media), data 102 derived from statements (such as, for example, postings made by the user on social media), or data 102 derived from any other sources, such as may be desired. In each case, it may be contemplated to have a different parser 104 be associated with the particular type of data, such that data derived from Big Data 102 is analyzed by a first parser 104 and so forth. It may likewise be contemplated for a plurality of instances of parsers 104 to operate in parallel on all types of data, or on multiple types of data, such as may be desired; for example, a plurality of instances of parsers 104 may provide the same parsing logic and may be applied to data 102 of all types, including Big Data, data derived from recipients, and so forth. Once data 102 is extracted, it may be contemplated for parsers 104 to store the data in the silos 106, for example directly, or may alternatively be contemplated for parsers 104 to store the data in one or more relational databases for the silos 106 to begin processing, such as may be desired.

In an exemplary embodiment in which a group of parsers 104 is provided, it may likewise be contemplated to provide load balancing between the parsers 104, such that, in a condition where a given parser 104 has too much leftover data and another parser 104 has a lesser amount of data, it may be contemplated for the first parser 104 to provide its excess of leftover data to the other parser 104 for processing. In some exemplary embodiments, such load balancing may be discretionary or temporary (or temporary subject to other conditions). For example, in an exemplary embodiment, it may be contemplated to have the system perform temporary load balancing at an initial step, determine after some time has passed whether processing is being performed more efficiently, and if the processing is being performed more efficiently, maintain the new load distribution, while if processing is not being performed more efficiently, restore the original state. Likewise, it may be contemplated for an alert to be sent to one or more administrators for manual review and intervention at any stage of this process, such as when load balancing is initially performed or when the system concludes that a different distribution of the load would be more efficient.

In an exemplary embodiment, a parser 104 or group of parsers may operate to request manual intervention in a case where data 102 is parsed through multiple parsers 104 or the entire set of parsers 104 without successfully being able to parse the data 102, which may allow the process to be performed as a supervised AI process rather than an unsupervised AI process. For example, it may be contemplated for a new kind of personally identifiable information to be detected (via use of the user's name and so forth) which also includes accompanying data which is clearly recognized as a type of data but which is otherwise not associated with any specific parser 104. (For example, a user might have their DNA profile leak from an ancestry site; this might simultaneously be very important PII and something that a parser does not necessarily know how to handle; this may trigger an alert for manual intervention.) Likewise, it might be possible for a human reviewer to identify patterns that might not be meaningfully legible to an analysis program but which might be recognized by a subject-matter expert in a relevant field as supporting a particular conclusion about the user's identity. (This might, for example, be demonstrated in a virtual environment such as a video game or metaverse area, where an outside observer might be able to better recognize a pattern. For example, if the user occasionally plays an online shooter game, but regularly duplicates actual military drills, like military room-clearing procedures, when they do so, the user may be former military. In an exemplary embodiment, some or all such data may be automatically flagged for human review, if desired.)

In an exemplary embodiment, the silos 106 may include individual silos related to one or more topics or fields of expertise. In some exemplary embodiments, it may be contemplated for the silos 106 to partially or wholly assume the role of subject matter expert; for example, it may be contemplated for a given silo 106 to act as the subject matter expert for a particular field of topical data based on AI structuring of the silo 106. The data stored in this manner in the silo 106 may then be provided directly to the respective persona 108, allowing the persona 108 to have a steady stream of pertinent data. It may likewise be contemplated to distribute any or all of the processing functionality to be performed by the silos 106 and the personas 108 in any other manner, including in arrangements where different processing is performed by each silo 106 at the silo level or by each persona 108 at the persona level; for example, it may be contemplated to have the personas be task-bound trained algorithms with a single topological data expert (STDE). Various other methods of implementing inducting and deductive processing by the silos 106 and personas 108 in some combination may likewise be contemplated.

According to an exemplary embodiment, these silos may be, for example, an economic silo dealing with the topic of economic data, a military silo dealing with the topic of military data, a political silo dealing with the topic of political data, and a social silo dealing with the topic of social data, but any other silos may be contemplated as well. (For example, it may be contemplated to subdivide the social silo further, based on types of social groups or interactions; for example, it might be contemplated to separate out social data derived from the network, such as direct interactions on social media, from social data which reflects activities occurring outside the context of the network, such as postings on social media.) In some exemplary embodiments, the personas 108 provided at any given time may be dynamic, and it may be contemplated to dynamically create or update one or more personas 108 following one or more instances of operation of the system, such as may be desired.

According to an exemplary embodiment, it may be contemplated for each of the personas 108 to be domain-specific subject matter experts, with personas 108 being uncontested with respect to the single topological data that the personas 108 are experts on. In cases where multiple topological data values are provided, and where this results in a conflict between outcomes presented by a first set of the personas 108 and a second set of the personas 108 that would otherwise be related to the multiple topological data values and which would be relevant to some of the topological data values in the set, it may be contemplated to resolve the conflict on the basis of a majority vote of the personas 108, with the conflict optionally being flagged in some way for later review. In an exemplary embodiment of a resolution procedure, it may be contemplated for the minority data associated with the minority set of personas 108 to be taken offline, out of the main database, and instead stored in a separate conflict database, with the minority set of personas 108 then adopting the data used by the majority set of personas 108.

In an exemplary embodiment, it may be contemplated for such a conflict procedure to be iterated, if desired, or for resolution of an issue related to an erroneous or incomplete data set to likewise be iterated. For example, according to an exemplary embodiment, when a given problem is encountered, such as a repeating or graduating null-pointer error, this may be remediated by graduation of the problem up the toolchain, with final resolution of the issue being handled by human validation of the supervised learning such as is necessary. In each stage where the personas 108 may conflict, a final result may be driven by the voting system of the personas 108.

Each silo 106 may store data in a format accessible by one or more personas 108, for example according to an exemplary embodiment whereby each persona is or includes a software algorithm specializing in a particular silo of data. For example, in a given exemplary embodiment, it may be contemplated to separate out personas 108 by providing, for each silo 106, a persona 108 operable to search for explicit data that is intentionally provided in one or more data streams and a persona 108 that is operable to search for implicit or implied data, which is not provided intentionally but which otherwise can be gathered from available data streams.

The silos 106 may further incorporate one or more aspects of a post-conflict resolution database, which may be wholly or partly incorporated into the silos 106. In an exemplary embodiment, it may be contemplated for conflicted data to be, once identified as conflicted and restricted from future processing, stored in the post-conflict resolution database (which may, for example, be implemented as another silo 106) or may be maintained within the silos 106 as conflicted data, such as may be desired. (In some exemplary embodiments, it may be contemplated to perform a combination of these activities; for example, it may be contemplated for conflicted data in a case where there is a close to even split in the personas 108 to be maintained within its respective silo 106 pending later review, while in a case where there is a much more substantial difference in votes between personas 108, it may be contemplated to move this data to a separate post-conflict resolution database prior to review.) Once the conflicted data has been stored and flagged, it may be manually reviewed as part of a supervised learning process; in an exemplary embodiment, a system may be configured to alert an administrator if any conflicted data has been identified, or may be contemplated to alert an administrator once a certain amount of conflicted data has been collected, such as may be desired.

In an exemplary embodiment, it may likewise be contemplated for data to be restored from a post-conflict resolution database, for example if a manual review process determines that the majority of personas have performed an erroneous computation, and that the minority of personas 108 were correct (or that no personas 108 were correct). In such a case, it may be contemplated for the conflicts to be manually resolved to their desired outcome, with the previous data state being reestablished, and with the data transferred to the post-conflict resolution database external to a silo 106 or flagged as post-conflict resolution data within a silo 106 to be restored and used as the basis for the new outcome.

In an exemplary embodiment, the personas may interact with the sim world 110 that has been assembled from the data 102 and the processing performed by each persona 108. According to an exemplary embodiment, the sim world 110 may be formed via a digital twinning process where physical layers of digital twins are derived from data processing. Digital twins may exist within the sim world 110, with each digital twin on its own representing data associated with one particular user, isolated from any interaction data. The sim world 110 may then further store interaction data associated with particular pairings or groupings of digital twins, allowing for analysis of network interactions between the digital twins. (Effectively, digital twins may be two-dimensional, while the sim world 110 may become three-dimensional by adding in this network information.)

In an exemplary embodiment of a sim world 110, the sim world 110 may incorporate structure or constraint data from a variety of sources. A first source may be a digital representation of a physical world, such as geographic maps (streets, roads, bodies of water, geographic features and political boundaries, and so forth), as well as other data about the physical world such as blueprints and schematics of individual buildings. A second source may be structure or constraint data associated with an individual physical being, such as one of the digital twins simulated by the system, which may include a variety of distinct key data attributes that are unique to the physical being. In an exemplary embodiment, such attributes may be ingested into the sim world 110 at a granular data level, which may be selectively summed in order to allow derivation of distinct attributes that allow for reconstruction of an individual's physical life. (For example, individual distinct attributes might include a person's home address, their place of work, their phone number or other contact information such as their email address or their contact information on a particular messaging service, their items owned or purchased, the names of their spouses or children or any other information associated with their spouses or children (or other relevant relatives), and so forth. A third source of structure or constraint data may be the connectivity between digitally simulated twins and the representative digital mass in the virtual space, which may bridge the first and second sources.

According to an exemplary embodiment, once some or all of the constraints mentioned above have been used to construct the sim world 110 in this manner, the data that has been reconstructed via the creation of the sim world 110 may be interpreted and output to the user. For example, the derived data may be output in the form of a report providing a list of all of the user's identified or probable digital exhaust exposure, either derived directly or from Big Data analysis, which may include, for example, information the sim world 110 is able to reconstruct about the user's names, aliases, social media accounts, phone numbers, marital status, family members, friends, sources of income, medical status, gender identity, sexual proclivities, religious views, political views, social media faux pas, finance status, sleep cycles, reading habits, sense of humor, predicted next major purchase, and any other pertinent information that may be reconstructed.

In an exemplary embodiment, it may be contemplated for the sim world 110 to retain probability information associated with the reconstructed information, for example in cases where the sim world 110 does not have complete certainty about the information derived from any particular source or in cases where the sim world 110 has received information that would allow for multiple potential manners of reconstructing the information. For example, in an exemplary embodiment, it may be the case that a person shares a name with multiple other people, who might have the same first and last name and who might live in a similar area; for example, there might be many different people named "John Smith" living in the same geographical area, such as in the same major city. (There might likewise be similar matches in secondary information that might be used to differentiate them; for example, there might be multiple different people with the same first and last name with the same middle initial, e.g. "John Q. Smith," there might be multiple different people with the same first and last name in the same age range, e.g. "John Smith, age 47," and so forth.) As such, it may be the case that when information is encountered that mentions "John Smith," it may potentially be matchable to "John Smith 1" (in this example, John Q. Smith, age 47, from Topeka, Kansas) or to "John Smith 2" (in this case, John A. Smith, age 73, from Buffalo, New York), or to various other "John Smiths." In an exemplary embodiment, a sim world 110 may construct information about a person's profile based on a highest probability of matching, for example matching aliases, social media accounts, phone numbers, and so forth to the "John Smith" with the highest degree of matching, and only to this "John Smith." In another exemplary embodiment, a sim world 110 may not exclusively associate this data with one profile, and may associate this profile information with each John Smith that has over a given level of probability of matching, even if this could lead to multiple assignments; for example, in an exemplary embodiment, it may be reasoned that there are few enough cases where people have identical names, identical ages, live in identical cities, and so forth that the information can be assigned multiple times, and so in a case where there are two people named John Q. Smith, age 47, who live in Topeka, Kansas, phone number information associated with this record may be associated with each of the two people, potentially alongside listed uncertainty information such as may be desired. In an exemplary embodiment, this uncertainty information may be periodically revisited by a reconstruction algorithm, for example based on any changes to probabilities that have been obtained from new data.

Likewise, once the sim world 110 has been constructed, it may be contemplated to have the sim world 110 maintain information about the source of each form of data that was used in order to determine some of the above data, or which theoretically could have been used if the data has been derived from one source (for example, being preferentially derived from one source) but could have been obtained from multiple sources. (For example, it might be the case that information on the user's family members was derived from a source which allowed the system to have >99% certainty, but that other sources would allow this to be derived with −85% certainty, which may be sufficient for inclusion in the report on its own but which is less than the near-certainty provided by the other source.) In this case, it might be contemplated to list each of the sources of the user's exposure or possible exposure, for example in descending order of certainty of the information or according to another ranking system, in the prepared report. To the extent that any of the information had been derived from paid sources, such as via the use of a data market to perform traceability mapping, it may likewise be shown to the user what it would cost to reconstruct their data. (It likewise may be contemplated for there to be multiple different sources of information obtained from the paid sources, and in such exemplary embodiments it may be contemplated for the system to attempt to reconstruct the data in multiple ways.

According to an exemplary embodiment, the system may then operate to provide judgments, which may be elicited by capturing the streaming outcomes mapped through behavior data. It may likewise be contemplated to validate the quality of the data, which may be based on, for example, associating data records having matching information with one another. In an exemplary embodiment, assessment for quality validation may become exponentially faster the more time quality data and decisions continuously feed into the system, for example because it may be increasingly possible to associate matching data records with one another to improve a probability that a given data value is associated with a particular profile; for example, the system may consider several data records having an association between a person's profile and a particular phone number to have a higher data quality than one single data record having an association between the profile and the phone number.

In an exemplary embodiment, it may be contemplated to compare collected information to a pre-existing profile in order to ensure adequate data quality. For example, in an exemplary embodiment, business line or application profiles may provide benchmarks for assessing the quality of specific reports and outcomes. Verification quality may fine-tune the model for increased accuracy and speed as each profile refines with increased data consumption.

Figure 2:
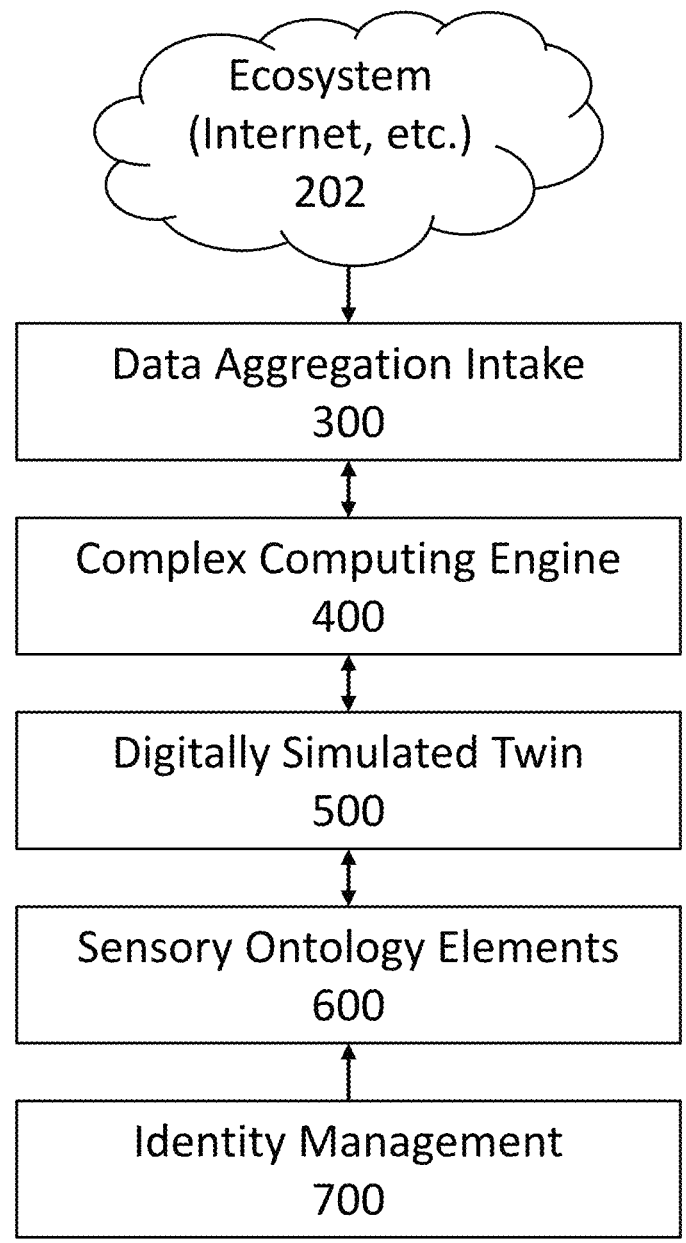
FIG. 2 is an exemplary diagram illustrating a system for creation and management of digitally simulated twins.

Looking now at exemplary FIG. 2, FIG. 2 shows an exemplary flow diagram illustrating a system for creation and management of digitally simulated twins 200. According to an exemplary embodiment, the system 200 may retrieve data, which may include but may not be limited to Internet of Things data, from a broader network ecosystem 202. According to an exemplary embodiment, incorporation of data may be handled by a data aggregation intake subsystem 300, which may provide the data to a complex computing engine subsystem 400. Digitally simulated twins 500 may be stored within the complex computing engine 400, sensory ontology elements 600 may be connected to the other systems and particularly to the data aggregation intake 300 and the complex computing engine 400, and an identity management subsystem may likewise be connected to the complex computing engine 400.

Figure 3:
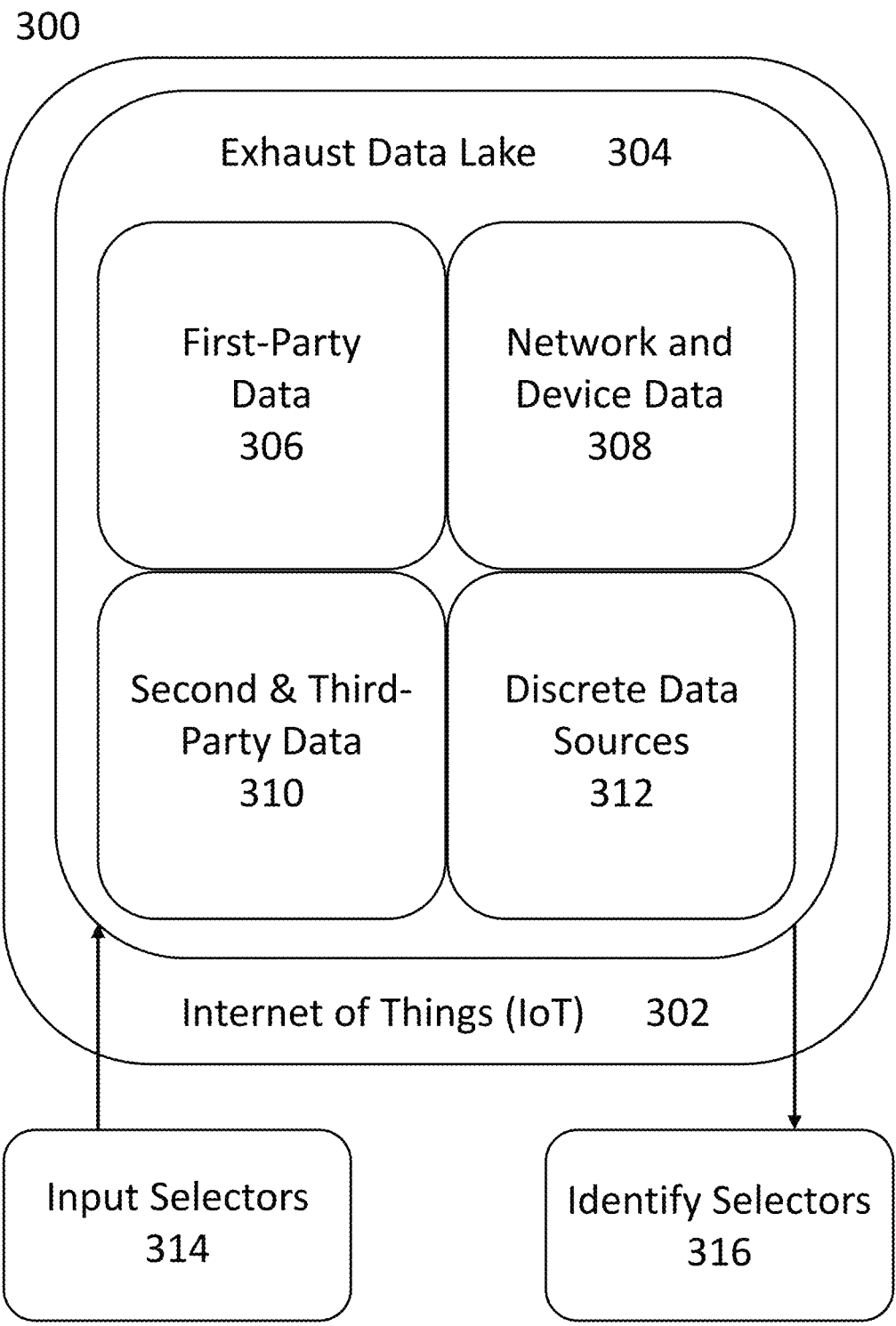
FIG. 3 is an exemplary flow diagram illustrating a data aggregation intake.

Looking now at exemplary FIG. 3, FIG. 3 shows an exemplary flow diagram illustrating a data aggregation intake 300. According to an exemplary embodiment, a data aggregation intake 300 may incorporate data from the Internet of Things 302, with an exhaust data lake 304 formed from this data (and/or other data) being maintained by the system. According to an exemplary embodiment, an exhaust data lake 304 that may be maintained by the system may draw data from one or more sources of consumable data, which may include first-party data 306, network and device data 308, second and third-party data 310, and/or discrete data sources 312, such as may be desired.

According to an exemplary embodiment, "first-party data" 306 may be defined here as data derived by the data management platform directly from the person being modeled, and may include information collected from customers of the data management platform, data collected from site visitors to a site operated by the operators of the data management platform, and users of a mobile device application operated by the operators of the data management platform, as well as any other users of any sites, applications, products, and/or services connected with the data management platform. In one possible exemplary embodiment, a selector may input, to a data management platform website, personal information including name, email, and phone number. The user may further install a particular application onto a mobile device that is equipped to scan the mobile device (or may further install an application onto a laptop or other personal computing device that may be equipped to scan it), with the application then retrieving, to the data management platform, information available from other applications installed on the user device once scans are completed. Information from the user's network and devices provided on the user's network 308 may be collected similarly; for example, it may be contemplated to have an application downloaded onto the user's mobile device and which is connected to the user's network scan for other hardware connected to this network, such as a router, a video doorbell or other camera system, a smart appliance, a printer or scanner, or any other systems that may be present on the network. Likewise, it may be contemplated to derive data from hardware, as well as from information that may be stored on the device; for example, it may be contemplated to retrieve Bluetooth information from a mobile device in order to determine a user location with a reasonable degree of accuracy.

Likewise, "second-party data" 310 may be data collected from partners or direct sellers offering similar information to "first-party data," which is derived from user interactions with their own system. For example, in many cases, data may be provided as a result of some kind of corporate cooperation between the operator of the data management platform and the source of the second-party data 310, such as online ad campaign data and customer journey/customer experience data relating to customer purchases of particular items.

"Third-party data" 310 may be data derived from data providers which is available on the market for purchase, and may be a collection of all types of data that may be available for a particular person. For example, this may include information purchased or otherwise obtained from data aggregators, data brokers, data resellers such as FACEBOOK and GOOGLE, and so forth. In many cases, this data may have been derived from sources similar to first-party data 306, but may also include information gleaned via outside research, or replicated from offline sources. (For example, in an exemplary embodiment, one or more websites offering background checks or criminal record reviews of a person may derive their data from city records that are kept offline or which are otherwise not searchable, and then may sell this information.)

Any or all of the first-party data 306 and the second/third-party data 310 may include any or all of observed data relating to the digital footprint of the user (search history, type of Web browser used, etc.), inferred data providing conclusions based on a user's Internet behavior, declared data explicitly provided from users such as online forms or application signups, or a combination of any or all of the three. (In certain exemplary embodiments, information may be useful directly or indirectly. For example, it may be of interest to derive inferred data from third-party sources 310 in order to determine what conclusions third-party sources 310 are able to draw about a person, or it may be of interest to look at declared data provided by the user to certain types of applications in order to see how forthcoming a user is with their data, for example to see if a user uses particular alias information or a less-used email address to sign up for applications that appear to have poorer security.)

For example, according to an exemplary embodiment, the system may be configured to collect data from any or all of these sources including demographic data, geographic data, attribute data, user interest data, data from the person's Internet history or browsing sessions such as cookie IDs or other online behavior history, data from specific ways of accessing the Internet or from specific data downloaded from the Internet such as mobile app identifiers, and so forth, such as may be desired. According to an exemplary embodiment, data collection and analysis may be an active and ongoing process, such that digital twins are actively created and maintained in multiple dimensions in a manner that incorporates data newly generated by or about the user.

In an exemplary embodiment, a system such as a data management platform (DMP) may be configured to collect first-party data 306 from data sources including both online and offline first-party data sources, such as information that might be collected by typical computing devices such as laptops or smartphones (e.g. website data, data from social media platforms, mobile device and application data, customer relationship management data, web-analytics tools, purchase history data, email and call center data, and so forth) as well as other data that might be collected by other smart devices capable of accessing the Internet (e.g. TV watching activity from a smart TV, order activity from a smart refrigerator, and so forth).

Likewise, according to an exemplary embodiment, a system such as a data management platform may be configured to collect second-party or third-party data 310 from a similar variety of data sources in order to enrich the dimensions of digitally simulated twins.

According to an exemplary embodiment, it may be contemplated for the system to populate the exhaust data lake 304 by selectors received from user input 314, which may, for example, make use of inductive methods of reasoning. It may likewise be contemplated for the system to identify further selectors from the exhaust data lake 304 data, for example by deductive methods of reasoning.

Figure 4:
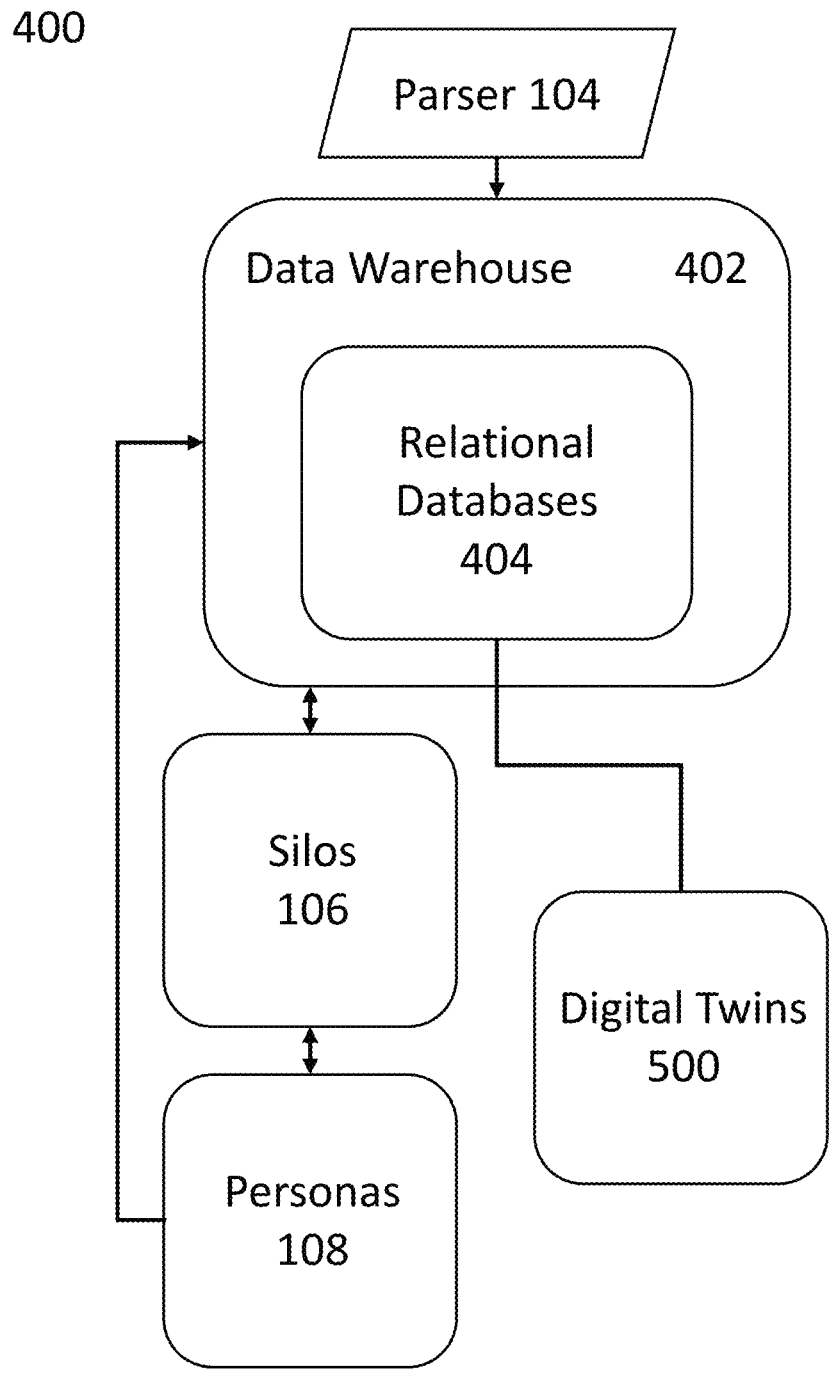
FIG. 4 shows an exemplary flow diagram illustrating a complex computing engine.

Looking at exemplary FIG. 4, FIG. 4 shows an exemplary flow diagram illustrating a complex computing engine 400. According to an exemplary embodiment, a complex computing engine 400 may incorporate a parser 104, which may be configured to receive and parse new data inventory from the exhaust data lake 304. The new inventory parser 104 may then communicate this data to a data warehouse 402, which may include one or more relational databases 404 configured to retain digital twin data 502, which may be constructed from silo 106 and persona 108 processing functions operable to capture the summation of granular digital twin element data 500 that may be maintained in the relational databases 404, for example in a configuration whereby digital twin element data 500 relating to different subject matter or different digital twins is maintained in distinct relational databases. In an exemplary embodiment, once all of the data from the exhaust data lake 304, including first-party data 306, second and third-party data 310, and other such data, has been standardized and ingested into the data warehouse 402 by the parser 104, this data may then be used in order to form the distinct elements supporting a multi-dimensional digital representation of a user in the simworld of the system provided at a later stage.

Looking, for example, at an exemplary data flow, it may be contemplated for a first user, User A, to download a mobile application associated with the system and provide personal details such as gender, email, age, and location, which may then cause the system to apply this data to the respective digital twin data 500 that is associated with the user. In particular, the data provided by the user may be applied to their digital twin's identity characteristics, demographic data, and geographic data, each of which (according to an exemplary embodiment) may be stored in separate relational databases 404 with User A's unique ID. This may then be enhanced with other data available to the system, including, in this example, User A's web search history, which may show (for example) further geographic data such as searches for nearby places of interest (e.g. "what time does the grocery store on Twelfth Street close") or any of the other types of data. This information may, accordingly, be stored in the respective relational databases 404 as well. Next, purchased third—party data may likewise be integrated; this may, for example, show that User A really likes the Nike brand, resulting in the system enriching the behavior attributes of his virtual twin in order to reflect brand preferences.

Looking at a data flow having to do with integration of data, it may be contemplated for further transaction and purchase history data to be purchased or otherwise retrieved by the system, and for this information to be fed through the parser 104. In a first step, transaction and purchase history data may be provided to a system data lake 304, and it may then be formatted and captured for consumption by the data warehouse 402. In a first step, the new inventory parser 104 may confirm that the purchase history pool is uniformly consumable for the data warehouse 402, which may be performed by, for example, ensuring each string contains certain data relating to purchase activity. (One example string might be, for example, Unique ID+Executing Business+Purchase Method+Transaction Amount+Transaction Currency+Currency Amount+Purchased Item(s), though it might be contemplated to incorporate more or less information than this; in another example, purchase timing may be tracked down to the millisecond but all transaction values may be normalized to the same currency, with other implementations likewise being possible.) The processed Purchase History list may then be stored in a master relational database among the relational databases 404, which may in this case be the "Master Purchases" database. Next, the new inventory parser 104 may confirm the transaction pool is uniformly consumable by ensuring each transaction string contains the requested string data (in this case, "Unique ID+Executing Location+Receiving Party+Domiciled Currency+Domiciled Currency Amount+Receiving Currency+Receiving Currency Amount," or whatever other string data is required to be provided uniformly). The processed Transactions list may then be stored in a master relational database 404, "Master Transactions," and may be isometrically stored in sub-relational databases. (For example, in an implementation where currency is being specifically tracked, such as in the contemplated example, transactions where the executing party's currency is dominated in Brazilian Real may be stored in a first static relational database: "Brazilian Real Transactions," transactions where the executing party's currency is dominated in USD may be stored in a second static relational database: "USD Transactions," and cross-currency transactions where one party is located in another may be stored in a third static relational database: "Currency Exchanged Transactions." Other implementations may likewise be provided, such as "USD Transactions" and "Foreign Transactions," and so forth.) The data warehouse 402 may also maintain a relational database 404 for any other topics of concern or potential legal value, such as, for example, separate relational databases 404 for Illicit Actors, Illicit Aliases, Transactions >$10,000 USD, and Transactions <$10,000 USD (based, for example, on legal requirements related to reporting transactions over this value). Other thresholds and databases may likewise be defined, such as may be desired.

Looking now at the silo-persona structure that may be provided by the complex computing engine 400, according to an exemplary embodiment, it may be contemplated for the data warehouse 402 to store a plurality of eigenvector dimension silos 106, which may be used to generate dynamic personas 108. According to an exemplary embodiment, the data warehouses 402 may be contemplated to exchange data back and forth with the plurality of eigenvector dimension silos 106, with each of the eigenvector dimension silos 106 then being used in order to generate and maintain the dynamic personas 108, with each dynamic persona drawing from one or more of the silos 106. (For example, in an exemplary embodiment, it may be contemplated for silos 106 to include a dedicated silo for economic data, a dedicated silo for military data, and so forth, and a given persona 108 may be constructed from both economic data and military data, or any other silos that may be maintained in parallel with those. In an exemplary embodiment, it may be contemplated for each persona to draw or attempt to draw from each of the silos, such that in a configuration where silos 106 are provided for economic data, military data, political data, environment data, and social data, the system may poll each of these silos when constructing a given persona 108. In another exemplary embodiment, the system may draw from less than all of the silos in constructing a given persona 108, such as may be desired.) According to an exemplary embodiment, data from the silos 106 and personas 108 may likewise be stored in the data warehouse 402, and updated by further processing where appropriate.

According to an exemplary embodiment, in the complex computing engine, both silos 106 and personas 108 may make use of any or all of stored procedures, machine learning, artificial intelligence, and unique specialized databasing, such as may be desired. Silos 106 may represent processed digital twin 500 data attributes with a lower level of assessed multicollinearity for digital twin elements.

Looking at an exemplary data flow related to siloing of data, it may be contemplated that a given operator of a system may desire to specifically identify and filter all transactions above $10,000 USD, for example for regulatory reasons (e.g. based on U.S. law providing that Anti-Money Laundering and Counter Terrorist Financing transaction monitoring systems must flag transactions over $10,000 USD for potential suspicious activity.

Accordingly, a plurality of silos may be created to identify particular types of suspicious activity. A first silo, Silo: Terrorist Financing, may be programmed to identify money laundering by applying rules logic for illicit concealment methods from data available in the relational databases; User A's activity may be checked against this rules logic, and User A is not identified in the population. Silo: Thieves may be programmed to identify credit card fraud by applying rules logic for items purchased but not paid for using data available in the relational databases, and User A may likewise be checked against this and also not identified in the population. Likewise, User A's digital twin psychographic and behavioral elements may be enhanced from gleaned silo data, which may allow the system to draw conclusions about motivation via one or more machine learning processes or other techniques in order to show that User A is not motivated by drug trafficking or theft. Finally, Persona: Weapons may be used in order to process data from silos 106 to look for actors and patterns of those supporting and/or creating of weapons. In this exemplary embodiment, User A may then be identified because his purchase history contains sub-components of weapons material and his browser history shows he was researching explosives. Persona: Weapons may also detect that illicit behavior is likely occurring based on regular transactions of between $2,000 and $4,000 in which the receiving party is allegedly purchasing Nike goods. (The system may be able to identify this as suspicious based on pattern mismatch, due to the fact that this represents a disproportionate amount of money for most people to spend on Nike goods at all, let alone with any regularity, even if the machine learning tools relied upon by the system may be unable to identify the exact type of illicit behavior that is most likely occurring based on these transactions. It is possible that the financial activity might represent money laundering based on purchases of legitimate Nike goods at a substantial markup, it is possible that the financial activity may represent User A purchasing large quantities of counterfeit Nike goods for resale, it is possible that User A may find it easier to bribe certain foreign clients under sanction with Nike goods as opposed to with money, and it is possible that the transactions are simply fraudulently reported. It is also entirely possible, though perhaps unlikely, that User A is a millionaire philanthropist who spends his time coaching inner-city youth basketball teams, and that the transactions are entirely legitimate and improperly flagged.)

As a result of the detection, User A's digital twin 500 may be updated with new psychographic and behavior attributes, Silo: Terrorist Financing is enhanced with supporting detection logic, and User A is added to relational database: Illicit Actors. In an exemplary embodiment, it may be contemplated for the system to provide a visualization of recent update activity in key silos 106 or relational databases 404, for example new additions to the "Illicit Actors" relational database, so that these can be manually reviewed and any necessary changes made. (For example, this may allow the particular kind of illicit activity to be identified and flagged, and it may also allow for wrongly-flagged activity to be identified and used to retrain the system, to the extent that this is desired.)

To discuss various exemplary embodiments of how computation and comparison may be performed by the complex computing engine 400, it may be contemplated for the system to make use of eigenvectors in order to capture how silos and personas exponentially generate data to support constructing digital twin elements 500. Such exponentiality and pattern detection through inductive and deductive methods may allow the digital twins 500 to take on a multi-dimensional form within natively maintained relational databases.

To explain further how such processing may be employed by the complex computing engine 400, in linear algebra, an eigenvectors, or a characteristic vector of a linear transformation, are a nonzero vector that changes at most by a scalar factor when that linear transformation is applied. The corresponding eigenvalue, often denoted by k, is the factor by which the eigenvector is scaled. Eigenvectors are a special set of vectors associated with a linear system of equations (i.e., a matrix equation) that are sometimes also known as characteristic vectors, proper vectors, or latent vectors. Novel Quantum Computing methods leverage an approach combining heuristic-based analysis with an application-based datasets to quantitatively evaluate generalization of unsupervised generative models, and the first direct comparison of generalization capabilities between classical and quantum-inspired ML models. The presently contemplated complex computing engine 400 may be contemplated to build similar exponential and multicollinear computing methods used to address multi-dimensional evaluation.

The following terms may generally be pertinent to the use of eigenvector-based processing. "Eigenfaces" may relate to the field of image processing, and may in particular relate to the incorporation of data such as social media images and camera feeds. In image processing, processed images of faces can be seen as vectors whose components are provided by the brightness value of each pixel. The dimension of this vector space may then be the number of pixels. The eigenvectors of the covariance matrix associated with a large set of normalized pictures of faces are called eigenfaces; this is an example of principal component analysis. Eigenfaces may potentially be used for expressing face images as a linear combination of some of them. In the facial recognition branch of biometrics, eigenfaces provide a means of applying data compression to faces for identification purposes. There likewise have been efforts made to use eigen vision systems in order to determine hand gestures.

Similar to the "eigenfaces" concept, "eigenvoices" may be used in audio applications in order to represent the general direction of variability in human pronunciations of a particular utterance, such as a word in a language. Based on a linear combination of such eigenvoices, a new voice pronunciation of the word can be constructed. These concepts have been found useful in automatic speech recognition systems for speaker adaptation.

Further relating to eigenvalues, in spectral graph theory, an eigenvalue of a graph is defined as an eigenvalue of the graph's adjacency matrix A, or (increasingly) of the graph's Laplacian matrix due to its discrete Laplace operator, which is either D-A (sometimes called the combinatorial Laplacian) or 1-D-1/2 AD-1/2 (sometimes called the normalized Laplacian), where D is a diagonal matrix with $D_{ii}$ equal to the degree of vertex $v_i$ and in $D^{-1/2}$, the i-th diagonal entry is $1/\sqrt{(deg(vi))}$. The k-th principal eigenvector of a graph is defined as either the eigenvector corresponding to the k-th largest or the k-th smallest eigenvalue of the Laplacian. The first principal eigenvector of the graph is also referred to merely as the principal eigenvector.

The principal eigenvector may be used to measure the centrality of its vertices. An example implementation of this is GOOGLE's PAGERANK algorithm. The principal eigenvector of a modified adjacency matrix of the World Wide Web graph gives the page ranks produced by this algorithm as its components. This vector corresponds to the stationary distribution of the Markov chain represented by the row-normalized adjacency matrix; however, the adjacency matrix must first be modified to ensure a stationary distribution exists. The second smallest eigenvector can be used to partition the graph into clusters, via spectral clustering.

In an exemplary embodiment, it may be contemplated for clustering to be similarly applied, by the present system, to silo data 106 and persona data 108. Eigenvectors may likewise be used in order to partition the available data into meaningful silos 106 and personas 108, with categories of silos 106 and personas 108 being defined from the data as desired.

According to an exemplary embodiment, relational databases 404 may be structured as, or may include, one or more internal marketplaces managed by the silos 106 and personas 108. In an exemplary embodiment, after data is handled via the new inventory parser 104, which may operate to categorize, sort, and classify distinct data attributes for storing in the data warehouse 402 within a tabulated format, the data may be provided to the relational databases for management via the internal marketplace.

While the system is depicted as providing a data warehouse 402, a data lake 304, and a relational database 404 incorporating one or more data marketplaces, according to various exemplary embodiments, data storage within the system may make use of any combination of data warehouses, data lakes, and data marketplaces, such as may be desired. Likewise, it may be contemplated to pair any or all data storage methods with one or more visualizers that are particularized to the storage method or which may encompass a plurality of storage methods, such as may be desired. In another exemplary embodiment, visualization of data may be focused on a limited selection of the storage methods at the exclusion of others, such as may be desired.

As a general matter, it may be understood that internal data warehouses as provided herein may most commonly operate for the purpose of, and have structures that are optimized for, answering specific business questions. As such, internal data warehouses may be limited to basic tasks, such as reporting of data. Internal data lakes may offer slightly improved integration of documents, but may still suffer problems with automatically verifying, checking, or documenting data during ingestion, leaving retained data as opaque, dirty, and hard to navigate. A data marketplace structure, on the other hand, may be able to incorporate all enterprise data in any form, from raw to ready, and may allow for ready cataloguing of all technical, operational, and business metadata.

In an exemplary embodiment, visualization of the marketplace activity within the relational databases 404 that are or incorporate data marketplace structures may be based on virtual "sales" activity conducted between the silos 106 and personas 108. For example, a given application of a marketplace implemented on a relational database 404 may facilitate having the system continuously attempt to optimize and minimize the amount of money it would hypothetically take someone using an outside data marketplace to construct a persona 108 of a person based on the marketplace data, by conducting various marketplace trades on the relational database 404 marketplace. (For example, it may be determined that a first block of data information sold for a first price is more expensive than a combination of a second block of data information sold for a second price and a third block of data information sold for a third price, and so a cost estimate to replicate the persona 108 may be revised downward.) Visualization of this activity may be conducted accordingly, in various exemplary embodiments; for example, a visualization of the marketplace activity may show the most recent "sales" that were used to dynamically create or maintain a persona 108, or may show system progress on attempting to optimize prices or replicate personas, such as may be desired.

In an exemplary embodiment, the use of a marketplace structure as one or more of the relational databases 404, or incorporated into one or more of the relational databases 404, may likewise optimize expected retrieval times for the system. In routine applications of data warehouses, for example, it may be understood that only the data that is provided in the warehouse may be readily accessible, while new data may be more difficult to retrieve, making the system optimized for reuse of limited data in a single platform and making widespread reuse and collaboration impractical or impossible. In routine applications of data lakes, for example, data may likewise be restricted away from where it can be accessed by most people, and access to the data may require specialized programming and technical skills; even technical users may spend an inordinate amount of time finding and preparing datasets, and so this may likewise make widespread reuse and collaboration impractical or impossible. A marketplace structure, by contrast, may be more accessible to unsophisticated users, and so likewise it may be easier to pair a marketplace structure with automated systems like the dynamic personas 108; existing data marketplace implementations may be intended to emulate conventional online shopping experiences, allowing users to find, understand, and prepare datasets themselves dynamically, and may allow data to be routinely added in a short span of time, allowing widespread reuse and collaboration.

The use of a data marketplace structure in, or as, one or more of the relational databases 404 may likewise better allow for integration of the system with enterprise-ready data management solutions, which may for example allow for better management of security, better governance of the data, better analysis of metadata, and better protection of sensitive data. Current and new IT platforms may be developed particularly for data marketplaces, and so the repurposing of a data marketplace structure for internal data storage and optimization may better facilitate these goals by allowing the use of off-the-shelf systems with little adjustment. While internal data warehouses may similarly be associated with comprehensive, mature, enterprise-ready data management capabilities, internal data lakes generally do not have such solutions, and so the practical use of an internal data lake requires adjustment of open-source products and tools which tend to require additional work and which tend to put the operator's IT practices behind the security curve. Off-the-shelf data marketplace frameworks may inherently allow for comprehensive, mature enterprise-ready data management capabilities, but in other exemplary embodiments a newly developed internal marketplace program may be used as a relational database 404 or in a relational database 404, and likewise a mix of such frameworks (such as a mix of multiple existing off-the-shelf data marketplace frameworks) may be used.

Figure 5:
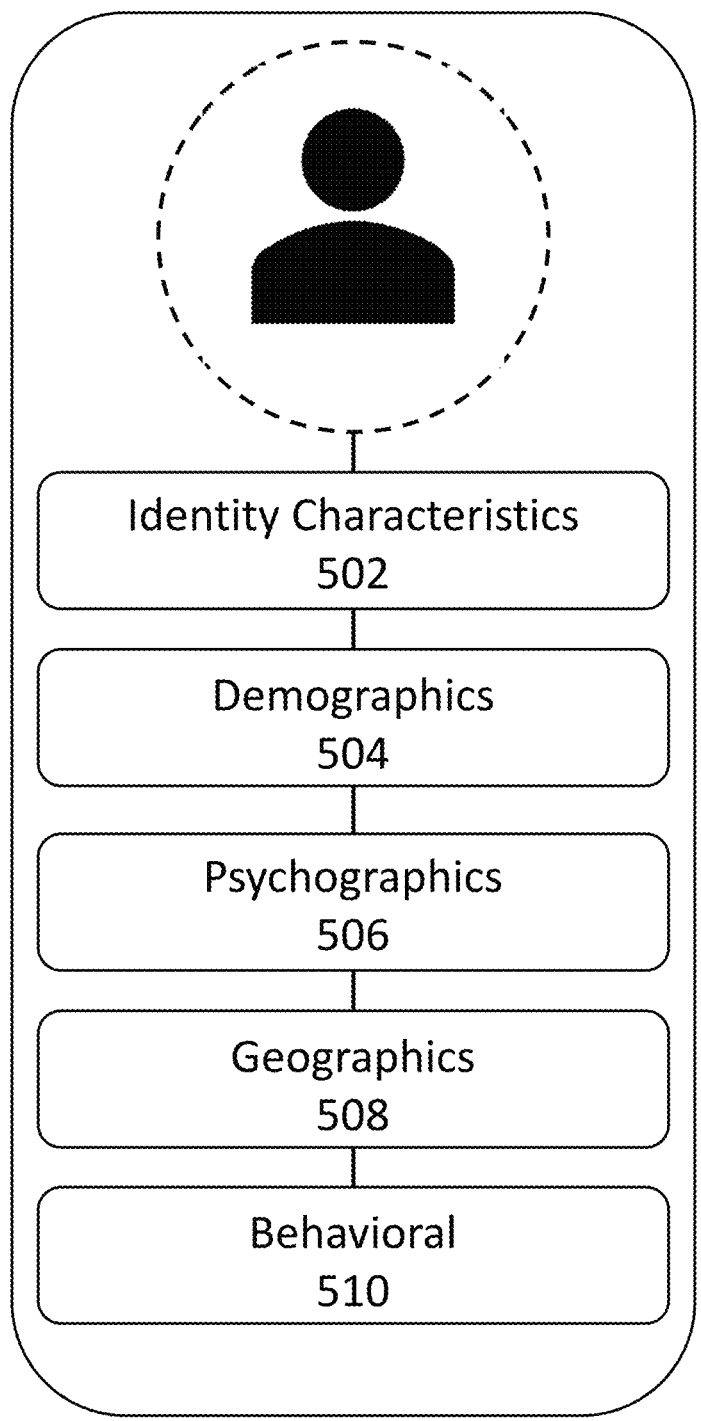
FIG. 5 shows an exemplary embodiment of a digitally simulated twin data structure.

Looking at exemplary FIG. 5, FIG. 5 shows an exemplary embodiment of a digitally simulated twin data structure 500. According to an exemplary embodiment, a digitally simulated twin 500 that is stored in the relational databases 404 may include identity characteristic data 502, demographic data 504, psychographic data 506, geographic data, and/or behavioral data for the twinned person, such as may be desired.

In an exemplary embodiment, identity characteristics data 502 may include information such a user's address, a user's phone number, a user's email address, and any other pertinent contact information for the user, as well as, for example, employment information (for example, employer name, job title, employer contact information, and so forth). Demographic data 504 may include, for example, age, gender, income, and so forth. Psychographic data 506 may include, for example, personality traits or motives derived from the person's activity, or any other similar data derived from any other sources. Geographic data 508 may include, for example, data relating to the user's legal area of residence (which could for example include the user's city, county, state, province, or country of residence, or any other such information) or data relating to any other legal areas of residence that may be pertinent (e.g. the user's city/country/etc. of origin, the city/country/etc. of the user's family, and so forth), as well as any data relating to physical geography (e.g. region data, climate data). Behavioral data 510 may include, for example, data about a person's behavioral habits, which may particularly include (given likely sources of information) but is not limited to advertising-related behavioral habits, such as brand loyalty or price sensitivity.

It may likewise be contemplated to store data relating to interconnections between digital twins 500, for example as a method of retaining information about the user's relationships and connections. For example, a given user represented by a digital twin 500 may be connected to one or more friends or colleagues which may have their own digital twins 500, which may be pre-existing or which may be created, and interrelationships between these digital twins 500 may likewise be stored by the system. It may then be contemplated for the system to perform network analysis on a detailed web of digital twins 500 including (for example) a user and all users having connections to the user, or all users connected to the user within a certain number of degrees (e.g. friends of friends).

According to an exemplary embodiment, it may be contemplated to provide one or more of the categories of data which forms the digitally simulated twin 500 as a non-fungible data token (NFDT), with the digitally simulated twin 500 itself constructed as a personal non-fungible data token (PNFDT) formed from a plurality of the non-fungible data tokens. For example, according to an exemplary embodiment, it may be contemplated to provide one or more instances of identity data 502 as NFDTs, such as a NFDT for each identity characteristic 502 or a NFDT covering a plurality of the identity characteristics 502 (for example, grouping "family information" including the names of several relatives under one token). Likewise, it may be contemplated to provide information regarding particular demographics into which a person falls 504 as individual NFDTs, with a first NFDT covering the person's race or ethnicity, a second NFDT covering the person's sex, and so forth. A similar approach may be provided for psychographic data 506, geographic data 508, and behavioral data 510, as well as for any other data that may be applicable to or stored in association with the digital twin 500 PNFDT. In an exemplary embodiment, it may be contemplated for tokenized information to be grouped from multiple tokens into a single token, or for tokenized information to be divided from a single token into multiple tokens, if desired, for example in order to better facilitate automatic inspection of data marketplaces for the data or in order to better facilitate sale.

For example, in an exemplary embodiment, it may be a standard behavior to group user data relating to "aliases" under a single NFDT, allowing this information to be searched for or traded, while the person may have different values that they place on each alias; they might, for example, have a first alias that they use to develop open-source software, which they may use strictly in order to avoid having their identity harvested by spambots, and a second alias that they use as a gamertag, which they may use in order to avoid having other players direct harassment at their real identity. As such, the person may place little value on whether the first alias is publicly associated with them, so long as it is not available purely for free in order to limit spam, but might attach greater value to whether the second alias is publicly associated with them, since a particularly frustrated opponent player might be willing to pay some amount of money to obtain this information in order to send threatening messages. In such an embodiment, the person might create two NFDTs associated with "aliases" under their identity characteristics 502, one associated with a first alias and one with a second alias.

It may, likewise, be contemplated for the person to create NFDTs relating to particular associations between data elements in different categories or groupings. For example, in an exemplary embodiment, a person may be associated with particular demographic information 504 that is shared with a large number of people and is not, on its own, personally identifying (e.g. the person is of African descent) and particular geographic information 508 that shared with a large number of people and is not, on its own, personally identifying (e.g. the person lives in Japan) that, when combined, is highly personally identifying and shared by only a very low number of people (the person is of African descent and lives in Japan). As such, for this specific person, the association between particular demographic information 504 and particular geographic information 508 may have a uniquely strong significance, which would not necessarily be the case for a person of African descent living in Africa (for example). Accordingly, in an exemplary embodiment, this association may have its own NFDT.

Figure 6:
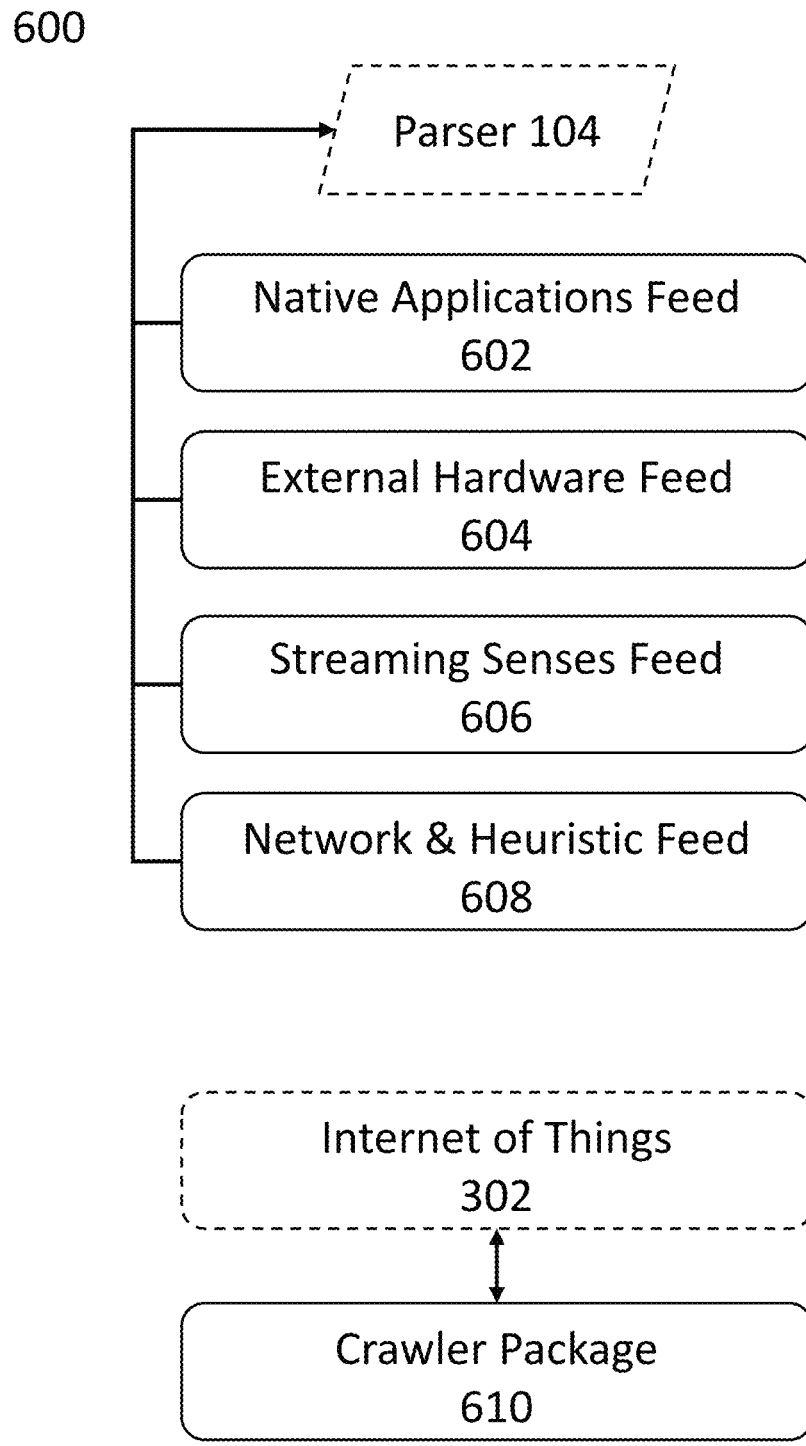
FIG. 6 shows an exemplary embodiment of sensory ontology elements which may be applied by the system.

Looking at exemplary FIG. 6, FIG. 6 shows an exemplary embodiment of sensory ontology elements 600 which may be applied by the system. According to an exemplary embodiment, a parser 104 may receive data from any or all of a variety of sources of consumable data, which may be or may include a native applications feed 602, an external hardware feed 604, a streaming senses feed 606, and a network and heuristic feed 608, as well as any other sources of consumable data such as may be desired. According to an exemplary embodiment, such information may be continuously supplied by a plurality of data feeds into the data warehouse 402, with this centralized collection point then being used to aggregate first-party exhaust data in order to support network and device vulnerability protection services.

An exemplary system may likewise include a crawler package 610. According to an exemplary embodiment, a crawler package may be configured to retrieve data from the Internet of Things 302 or from any other part of a data ecosystem 202, such as may be desired. According to an exemplary embodiment, a system may be configured to ingest data (including the digital dust provided by the Internet of Things devices 302 or any other applicable data) by the use of a plurality of crawlers which may be deployed throughout the data ecosystem 202 in specific parts of the data ecosystem 202, with each of the crawlers being configured to feed into the exhaust data lake 304 or into any component thereof. According to an exemplary embodiment, it may be contemplated to provide an intermediate system which operates to format the data prior to insertion into the exhaust data lake 304; in an alternative exemplary embodiment, the parser 104 may be configured to provide such formatting, such as may be desired.

Figure 7:
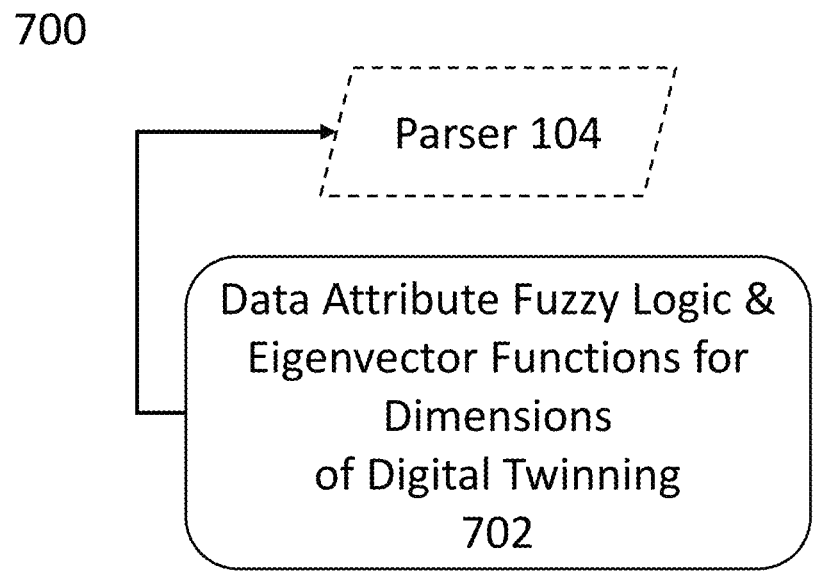
FIG. 7 shows an exemplary embodiment of an identity management system.

Looking at exemplary FIG. 7, FIG. 7 shows an exemplary embodiment of an identity management system 700. It may be contemplated to provide, as a set of functions provided to or integrated with the parser, a set of data attribute fuzzy logic and eigenvector functions 702 for providing the dimensions appropriate for digital twinning.

Figure 8:
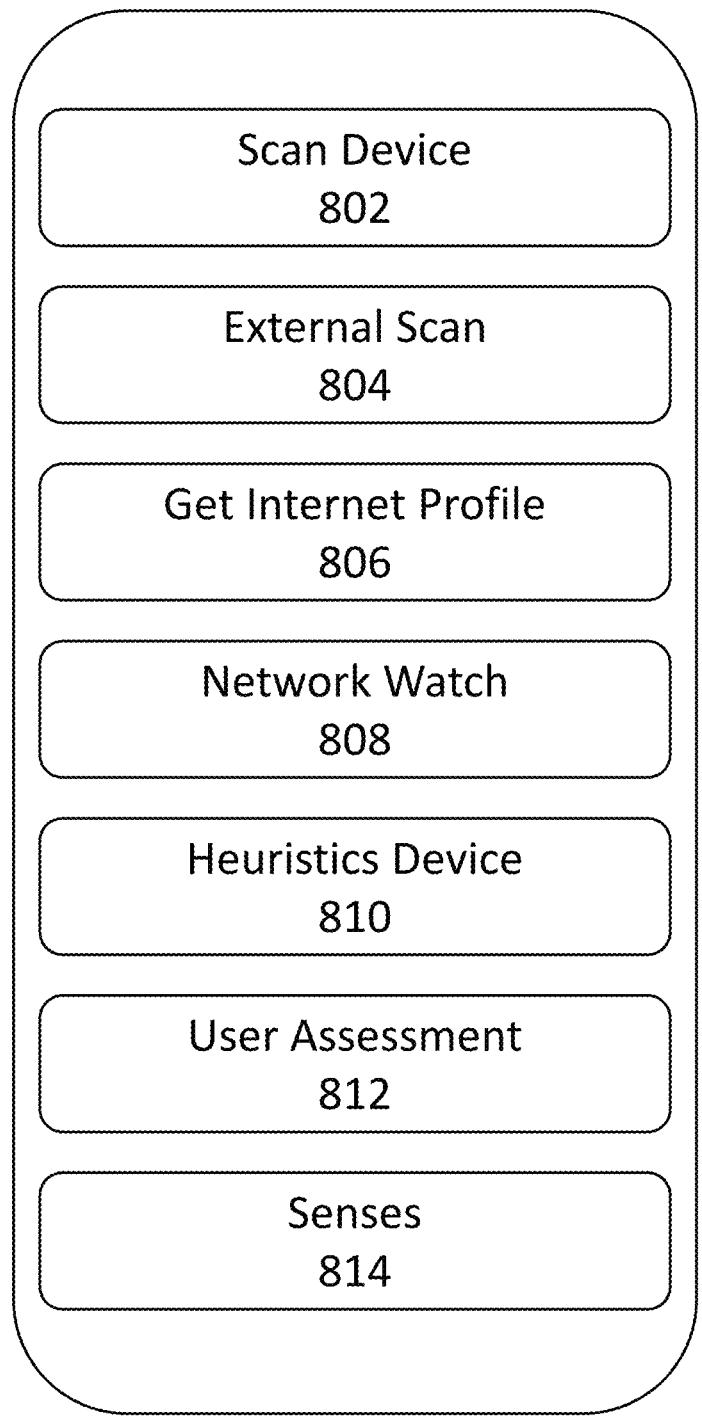
FIG. 8 shows an exemplary embodiment of a mobile application interface that may be paired with the system.

Looking now at exemplary FIG. 8, FIG. 8 shows an exemplary embodiment of a mobile application interface 800 that may be paired with the system. According to an exemplary embodiment, once a user has downloaded a mobile application 800, the mobile application may present an option to trigger a scan of the user's device 802 (which may review data present on the user's device such as downloaded files and applications, as well as data such as cookies, browsing history, and so forth that may be retrievable, and may compare installed applications to a blacklist or graylist, and so forth), an option to trigger an external scan of a device or network connected to the user's device 804 (which may trigger an external system to perform remote penetration testing of the user's device or any related devices or accounts, for example), to trigger retrieval of the user's internet profile 806 (which may, for example, provide the user with the data that the system has been able to construct about the user from the Internet, or that has been associated with the user with a reasonable level of certainty), to set up any monitoring of a network or other area that the system may be configured to perform 808 (which may, for example, include VPN data leakage detection and prevention), and to perform one or more device heuristics 810 (which might, for example, include conducting an inventory of current and past resource usage of the device of any or all of CPU, memory, space usage. and resource consumption pattern matching for dangerous malware activity). It may likewise be contemplated to have the application test any other systems available from or paired with the user device, such as a user's home network including various smart devices connected to a user's mobile device, such as may be desired.

According to an exemplary embodiment, it may be contemplated for a mobile application 800 to also relay one or more assessments to the user 812, in order to collect personal data about the user that the user is willing to directly provide. In an exemplary embodiment, it may be contemplated to determine the potential exploitation exposure of the user based on answered questions from the assessment 812.

According to an exemplary embodiment, it may further be contemplated for the system to retrieve sensed information relating to external factors 814, with one example being hazards affecting the user's travel. For example, according to an exemplary embodiment, it may be contemplated for a mobile application 800 to retrieve data including weather, fire, road construction, crime reports and so forth, which may allow the user to see how these events could impact the user's travels. In certain exemplary embodiments, such data may be public data or data retrieved from a particular public organization, such as data retrieved from a local municipal authority concerning a shooting in a particular area or data retrieved from the State Department designating an entire country or territory (such as, for example, Uganda) as potentially troublesome. Such incidents (which may be referred to broadly as "GPS Alerts" or "Areas of Concern" (AOC)) may be integrated into pre-populated data layers provided to the user, for example a "weather" layer, a "fire" layer, a "construction" layer, a "crime" layer, and so forth. In an exemplary embodiment, implementation of this functionality may make use of a similar siloed structure, for example with "weather" incidents being classified into a "weather" silo and so forth. It may likewise be contemplated for a person traveling through an area to note, and log, their own AOCs corresponding to areas of danger or concern upon observing the area, which may likewise be stored in the system (for example, in an appropriate silo). Such data provided by users may then be contemplated to be combined with data provided from other sources, such as public data; for example, it might be contemplated for a user report indicating that smoke is visible in a particular area to be combined with a report from a municipal police and fire scanner indicating that various emergency vehicles are en route to a particular location. In an exemplary embodiment, it may then be contemplated to visualize the data, for example with a map-based visualization where each of the available different data layers may be toggled on and off (potentially, incorporating or not incorporating the contributions of certain specific other users, if desired), with areas of concern being provided in proximity display as pushpins or circles on the map.

Figure 9:
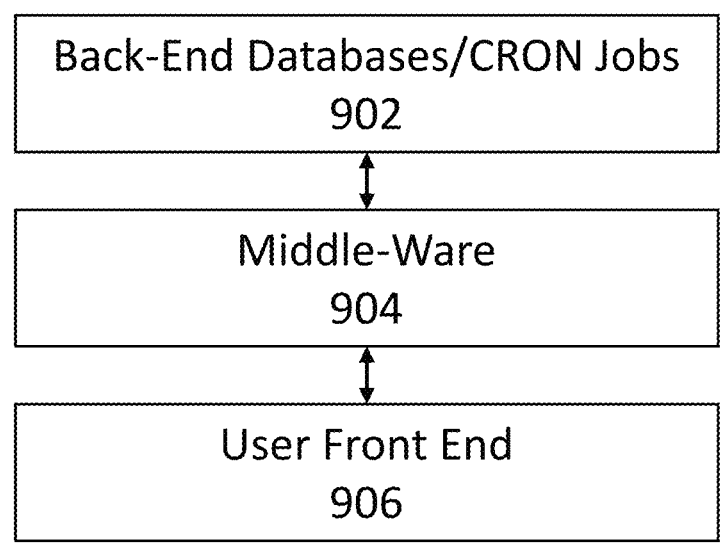
FIG. 9 shows an exemplary embodiment of a software structure of an application.

Turning now to exemplary FIG. 9, FIG. 9 shows an exemplary embodiment of a software structure of an application 900. According to an exemplary embodiment, the software structure of the application may have three parts: a back-end 902 which may include databases and CRON jobs, middle-ware 904 which may include an API interface for the application to access the database, and a user front end 906 which may, for example, be provided on a user mobile device.

Looking at the back-end 902, it may be contemplated for the back-end 902 to incorporate one or more databases including a user database, which may operate to store users, user information, user settings, and so forth, which may be used to validate login into the application and manage the information of the stored users. It may likewise be contemplated for the back-end 902 to handle certain scanning activities of the user's device, as well as record-keeping regarding such scanning activities; for example, in an exemplary embodiment, it may be contemplated for the application to retain historical/transactional data relating to applications that had previously been installed on the local device, as well as past data provided by the user, with this data inventory including, for example, cookies, tracking cookies, tags, current and past usage, remediation actions history, logs, website autofill information, and browser history, as well as any other related information such as may be desired. It may likewise be contemplated for the back-end 902 to include a list of blacklisted applications and a list of gray-listed applications to which the applications installed on the user device may be compared; this may, for example, extend to applications that had been previously installed on the device and which are later discovered to have vulnerabilities or other problems placing them on the blacklist or graylist, which may still represent potential sources of leaked data for the user. In an exemplary embodiment, this blacklist and graylist information may be updated using one or more CRON jobs, such as may be desired. It may likewise be contemplated for the back-end 902 to include any constants and global settings that it may be desired to maintain across systems, such as may be desired.

In an exemplary embodiment, the set of back-end databases 902 may further include an "areas of concern" (AOC) database, which may be used in order to store recorded AOC points. For example, according to an exemplary implementation of an AOC database, it may be contemplated for each AOC point stored in the database to have the following six fields: GPS location, radius of the area, label, date, time and a note field. A variety of AOC points may be contemplated, which may be classified into categories, including, for example, pollution, odor, noise, EMI, crime, war, weather, disease, ongoing disaster events, pollen, and any other data which may be available from one or more feeds, as well as a user self-defined category which may be used to encapsulate user contributions (or user contributions that would not fit in any of the above categories).

It may be contemplated for the database to pull data from a variety of locations, such as one or more public data feeds, which may have a larger or smaller degree of data resolution. For example, in an exemplary embodiment, it may be contemplated to retrieve war and disease information from a government travel advisory website, which may provide different data results for each country; for example, an entire country may be tagged with the status "War" or "Disease," and this may be displayed as an AOC over the geographic boundaries of the country as a whole. In another exemplary embodiment, it may be contemplated to retrieve weather data from one or more weather sites, such as the NOAA tracker for hazardous weather. It may also be contemplated to retrieve other information pertaining to AOCs, for example in much the same way as the retrieval process used for personally identifying information discussed in (for example) FIG. 3; for example, it may be contemplated to retrieve data relating to on-going events from one or more trending topics on social media, searching data like TWITTER hashtags relating to shootings, protests, police investigations, and so forth, in much the same way as if the system were discovering PII.

According to an exemplary embodiment, it may be contemplated for the back-end system 902 to perform operations including the following: a first CRON job intended to retrieve, from an external database, a set of blacklisted mobile device applications or other blacklist elements (such as, for example, out-of-date software or vulnerable devices on a user's home network), and a second CRON job intended to retrieve a set of gray-listed mobile device applications or other graylist elements. It may likewise be contemplated for the back-end system to provide a running process intended to scrape websites and databases for current information applicable to AOC data, and it may be contemplated for the back-end system to provide a running process to scrape TWITTER or similar social media via hashtags for current information.

Looking now at the middle-ware 904, it may be contemplated for the middle-ware 904 to accept and handle uploads provided by the user front end 906 application. In particular, such uploads may have or may include listings of applications provided on the user's local device (with the middle-ware 904 being configured to inventory the lists of apps that are provided by the local device, maintaining a record of these apps over time), which may include, for example, listings of social media, email, and communications apps. Likewise, such uploads may include active logins, such as user logins into browser social media pages, and may likewise include similar subject matter related to Internet activity, such as user cookies, tracking cookies, tags, and so forth, as well as other information that may be saved in association with a user browser such as autofill information retained in the browser. (This may include, for example, username information provided by the browser as information to be filled in one or more web forms, as well as any other such information, such as password information if unsecured, if desired.) It may further be contemplated for such uploads to include any other information related to the user's Internet activity, such as current and past resource usage by particular applications (such as Web browsers or other applications), such as may be desired.

In addition to accepting uploads, it may be contemplated for the middle-ware 904 to generate reports based on the uploaded information and provide suggested remediation actions from the information uploaded to it. The middle-ware 904 may also log this information over time, providing a remediation actions history capture that includes past remediation actions that have been recommended (which may, for example, be derived from the past logs of the middle-ware 904) and past remediation actions that have been taken (which may, for example, be derived from comparison of the past logs of the middle-ware 904, for example to identify applications that have been uninstalled from the user device or other such changes between uploads).

According to an exemplary embodiment, it may be further contemplated to have the middle-ware 904 include a connection to one or more external application programming interfaces (APIs), which may allow for updating of the databases with content loaded from elsewhere. For example, in an exemplary embodiment, it might instead be contemplated to retrieve some or all of the blacklist or graylist information via API upload, such as may be desired. In another exemplary embodiment, it may be contemplated to retrieve mapping data for the "areas of concern" database via one or more API connections, such as an API connection to GOOGLE MAPS or another such service.

For example, in an exemplary embodiment where mapping data is retrieved by the middle-ware 904 from a service like GOOGLE MAPS, it may be contemplated to have such a step take place prior to any updating of AOCs. Once mapping data is retrieved, and once AOC data has been retrieved that includes all necessary fields (such as GPS location, radius of the area, label, date, time and a note field), it may be contemplated to have the system draw the map, while adjusting the drawing of the retrieved map dynamically in response to the trouble spots retrieved for surrounding areas. Various exemplary embodiments of a method for adjusting the drawing of the map are possible. For example, in an exemplary embodiment, it may be contemplated to have the map be dynamically updated based on a current position of the user, with the map (and the areas of concern) being updated for a certain radius or certain range around the user, for example in a 10-mile range.

In an exemplary embodiment, user uploads from the user front end 906 to the middle-ware 904 may further include uploads of user-defined AOC information. For example, according to an exemplary embodiment, it may be contemplated for a user to be provided, on the user front end 906, with a user interface allowing the user to manually enter a location on a map display provided on the user interface; likewise, it may be contemplated for a user to add their current location as an AOC based on GPS data received from the user's phone, without reference to a map interface.

Figure 10:
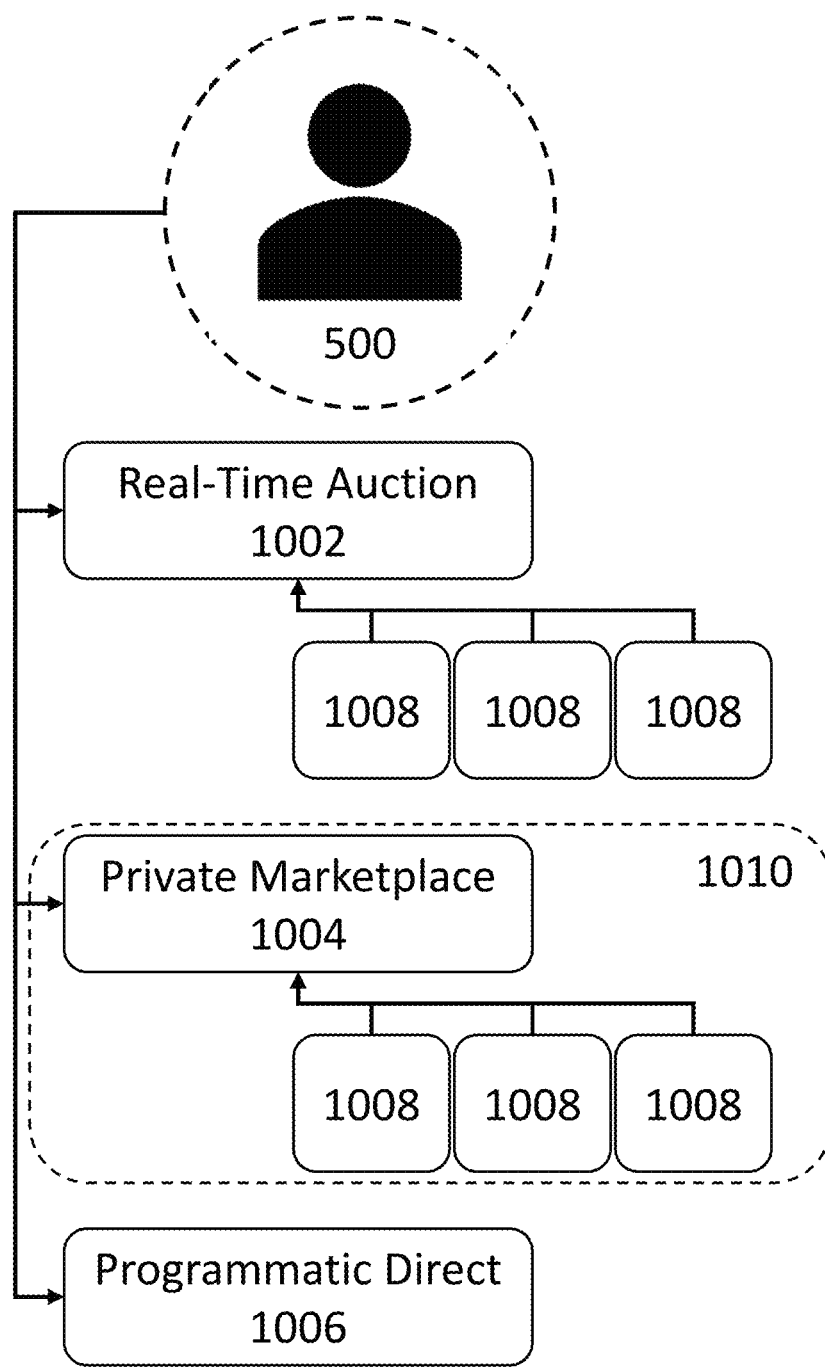
FIG. 10 provides an exemplary framework for data trading of digital twin data or any other personal data which may be present in the system.

Looking now at exemplary FIG. 10, FIG. 10 provides an exemplary framework for data trading 1000 of digital twin data 500 or any other personal data which may be present in the system. As a general matter, it may be understood that, like financial markets for trading securities, data markets may have a variety of potential frameworks, which may (in certain exemplary embodiments) be suitable for particular types of data or for particular participants. It may likewise be contemplated to make use of a variety of techniques applicable to financial markets for optimization of data trading activity, such as, for example, order book optimization, co-location, and latency arbitrage, which may be applied in order to optimize order execution.

In an exemplary embodiment, it may be contemplated for a system to host multiple types of data markets for selling of digital twin data 500 or elements of digital twin data 500, such as may be desired. For example, in one exemplary embodiment, it may be contemplated for a system to provide a real-time auction service 1002, also known as an open auction service, which may allow data prices (for example, for advertising making use of the data) to be determined in real-time. In a real-time auction service 1002, a variety of bidders 1008, commonly advertisers and publishers, may openly bid for data without restriction on which parties can place bids, generally making a real-time auction service 1002 a cost-effective way of buying large audience media.

It may likewise be contemplated to impose one or more restrictions 1010 on who can access the auctions, which may be provided by a private marketplace 1004. In an exemplary embodiment, a system may be configured to manage this on an invite-only basis (based on, for example, an application process allowing advertisers to apply for an invitation or access), with the system automatically checking credentials before a user session can be created or at the time that a bid is submitted. It may likewise be contemplated to have the system automatically perform an application process or some elements of an application process based on data harvesting such as is contemplated with respect to individual persons; for example, it may be contemplated for the system to perform reputation mining and some level of security analysis of a known advertiser in order to make an initial determination of whether an application should be approved, forwarded, or vetoed, such as may be desired.

Finally, it may be contemplated to perform such sales without bidding, via a programmatic direct process 1006. In such an implementation, a publisher may bypass auctions in order to sell their ad space on ad exchanges at a fixed cost per thousand impressions (CPM) to advertisers. The ad space is often sold to multiple advertisers across multiple ad exchanges. In an exemplary embodiment, a system may maintain programmatic direct 1006 connections to a plurality of ad exchanges, such as may be desired.

In an exemplary embodiment, it may be contemplated for a framework for data trading 1000 to make use of data provided in the form of, for example, non-fungible data tokens. According to such an exemplary embodiment, it may be contemplated for end users to sell their personal data and usage information associated with their personal data to digital advertisers and publishers via the contemplated framework, in NFDT form, allowing these end users to profit while controlling their privacy. In connection with the above, it may be contemplated for a variety of potential marketplace structures to be implemented, which may include, for example a personal data marketplace, a business-to-business (B2B) data marketplace, or a sensor/internet-of-things (IoT) data marketplace, among other such options.

According to an exemplary embodiment, it may be contemplated for the framework for data trading 1000 to have or include a personal data marketplace, in which a person is able to monetize their own data by selling it to various platforms. Data shared by users, for example in NFDT form, may include any data acknowledged by the system as significant or any other information that may be offered by the user, which may for example include the user's location, the user's food preferences, website designs that the user enjoys, and so forth. Various forms of pricing may be contemplated; for example, in an exemplary embodiment, it may be contemplated for individuals to set the price for their data and wait for a buyer, and in another exemplary embodiment, it may be contemplated for individuals to accept money or other incentives that may be offered by purchasers, for example including sign-up cash, gift cards, or other incentives provided by the marketplaces. In an exemplary embodiment, it may be contemplated to have the system selectively enable or disable access to particular marketplaces, for example based on the prevailing law of a jurisdiction in which the user is determined to be located based on address information associated with the user or based on any other location information associated with the user (such as, for example, citizenship information associated with a profile of a user, search history of a user that is indicative of a user's location such as searches executed on one or more mapping programs or search results conducted in a particular language, current GPS information retrieved from a mobile device of a user, or any other such information as may be desired).

According to an exemplary embodiment, it may likewise be contemplated to integrate one or more of the real-time auction framework 1002, private marketplace framework 1004, and/or programmatic direct structure 1006 with a business-to-business data marketplace structure or other marketplace structure, such as a sensor and/or Internet of Things marketplace structure. For example, according to an exemplary embodiment where there is integration between the one or more of the real-time auction framework 1002, private marketplace framework 1004, and/or programmatic direct structure 1006 with a business-to-business data marketplace structure, it may be contemplated for a system to collect and store data provided by a multitude of data providers on one platform, allowing organizational users to access an aggregate of pre-curated information from a variety of sources, enabling use of this information for marketing, sales, and business intelligence purposes. In various exemplary embodiments, it may be contemplated for business-to-business systems, personal data systems, and other such systems to be kept separate, while in other exemplary embodiments it may be contemplated for such systems to be integrated with one another or to communicate with one another in some respect.

For example, in an exemplary embodiment in which organizational data consumers are able to access an aggregate of information available for sale that may be provided by one or more businesses on a business-to-business marketplace (with some of that aggregated information pertaining to personal data), and in which the marketplace structure likewise includes a real-time auction 1002 structure or other similar structure for exchanging personal data of one or more users, it may be contemplated for a transaction conducted on a business-to-business marketplace structure to automatically include, as a validation step, purchasing of data for one or more users who can be identified in the aggregated data, from the real-time auction 1002 or from another source not directly affiliated with the business selling the aggregated data. Once this validating transaction has been performed, the business-to-business purchase may be conducted. (In another exemplary embodiment, it may be contemplated to have the aggregated data remove personally identifying information, such that data sold via the business-to-business marketplace just includes, for example, purchase information associated with demographic information or other such information that may be useful for marketing, sales, or business intelligence purposes without being associable with any specific user. Likewise, it may be contemplated for the aggregated data to be, or to include, information other than personal data, such as data about the business that is selling the information and so forth.)

It may be contemplated for data to be aggregated in various different manners within such a marketplace structure, and accordingly it may be contemplated for the platform to, as part of a data enrichment process, access and incorporate aggregated data according to these various different aggregations (which may, for example, include accessing data according to various different, overlapping aggregations in order to dis-aggregate certain data). This may, for example, include sorting and filtering data based on the properties of the data and then grouping the data with other data groups that are similar in properties to the sorted and filtered data. It may likewise be contemplated for data enrichment to select groupings based on criteria that is considered to be of interest to parties of a particular demographic assigned to the parties of the group, which may, for example, be used in order to determine which properties may be important to group by similarity in order to effectively group the data, or may be used in order to determine what degree of similarity is necessary to establish that data should be grouped, and so forth. For example, in an exemplary embodiment, it may be contemplated for certain data that the system may be configured to incorporate to have been aggregated based on the demographic information of persons characterized by the aggregated data, or it may be contemplated for certain data that the system may be configured to incorporate to have been aggregated based on demographic information perceived as relevant. For example, in one embodiment, data derived from or relating to persons classified into particular demographics may be grouped according to those particular demographics. (For example, data for 18, 19, 20, and 21-year-olds may all be grouped together, based on the similarity of those demographics.) In another exemplary embodiment, persons classified into related groupings of demographics may be aggregated according to other relevant logic; for example, data may be grouped according to what is most similar to what is relevant to a probable acquirer of the data. (For example, it might be contemplated to aggregate data for persons with German, Irish, Polish, and African-American ancestry, in anticipation that this aggregated information might be valuable to businesses operating in Chicago.) In each case, it may be contemplated for the system to collect and store this information.

In another exemplary embodiment, it may be contemplated to provide a marketplace particularized to sensor data, Internet of Things data, or other such data, which may in some exemplary embodiments be collected in real-time from one or more Internet of Things devices. In an exemplary embodiment, it may likewise be contemplated to provide collections of Internet of Things devices, such as one or more Internet of Things provided on one network (e.g. multiple camera systems or sensors associated with one house), provided in association with one another in the Internet of Things marketplace. Likewise, in an exemplary embodiment where a sensor or other Internet of Things device is automatically providing bundled data (for example, in a configuration where a smart appliance has a camera and additionally has a data feed for the appliance), it may be contemplated to unbundle this data, as desired. Such information may allow organizations to better understand consumer behavior, improve sales, and build better marketing strategies.

In an exemplary embodiment in which a system is providing multiple marketplaces in parallel—such as, for example, a personal data marketplace such as a real-time auction system 1002 that allows consumers to monetize their data, a business marketplace that allows organizations to exchange data, and a sensor marketplace that allows sensor owners to monetize their devices—each system may have separate and distinct structures or may have one or more shared structures between them, such as may be desired. For example, in an exemplary embodiment, a personal data marketplace may be configured to allow for business-to-consumer transactions, a business-to-business marketplace may be configured to allow for business-to-business transactions, and a sensor marketplace may be configured to allow for machine-to-machine transactions.

In an exemplary embodiment, each contemplated type of marketplace may be configured to handle data in a different manner, such as may be desired, so as to ensure proper data security and quality. For example, according to an exemplary embodiment, a personal data marketplace (handling personal and sensitive data) may be restricted to trusted sellers in order to ensure that data sold via the marketplace is of proper quality, with transactions being handled based on confirmation provided by the seller in order to ensure proper data security. In an exemplary embodiment, access to the system may be provided by a user application, an API, or some combination of the two; for example, according to an exemplary embodiment, it may be contemplated for individual user-sellers to be provided with an application which is used to access the marketplace and upload data for sale, and for buyers to be provided with an API that is used to purchase data.

In another exemplary embodiment, a business data marketplace (handling public and fact-level data) may be more open, lacking an equivalent restriction to trusted sellers; instead, it may be contemplated to have a business-to-business marketplace have a reputation system, with each business participating in the business-to-business system having its own crowdsourced reputation score, retrieved from past buyers. (In an exemplary embodiment, it may be contemplated to solicit feedback only from particular trusted members, or some other restriction may alternatively be imposed; in other exemplary embodiments, reputation may be weighted in some manner, such as providing businesses that use the service often, or have used the service more recently or for a longer period of time, with a greater capacity to adjust the reputation of some other business. In another exemplary embodiment, it may be contemplated for reputational crowdsourcing to be open to any business using the service without restriction. Multiple reputational services may also exist in parallel, if desired; for example, it may be contemplated to provide businesses with a reputational score derived from the contributions of all members and it may be contemplated to provide the same businesses with a reputational score derived from the contributions of a trusted set of members, with a given profile showing a general score and a "trusted member" score.) In an exemplary embodiment, it may be contemplated for transactions to be performed immediately in a business-to-business marketplace, without introducing a delay for confirmation to be provided by the seller; in another exemplary embodiment, it may be contemplated for some transactions to take place immediately and for some transactions to be provided with a confirmation delay, for example with trusted buyers or buyers with a higher reputation score being able to purchase immediately and with buyers with a lower reputation score being subject to a confirmation delay.

According to an exemplary embodiment, a sensor marketplace may be implemented similarly to one of the other marketplaces. In certain exemplary embodiments, it may be contemplated for transaction types to take place on a machine-to-machine basis, for example with an owner of a particular sensor device transacting with a trusted buyer that had been vetted by an operator of an Internet of Things management server, such as may be desired. In an exemplary embodiment, buyers may be able to purchase real-time sensor streams, delayed sensor streams (which may, for example, allow an owner of the sensor device to opt out of selling a data stream if the sensor has captured particularly sensitive information, before the data is sold), audited or vetted sensor streams (for example, audited or vetted by a service provider), or segments of such data, such as may be desired. in an exemplary embodiment, it may be contemplated to provide sellers and/or buyers with an API by which they can sell or buy sensor information; in an exemplary embodiment, it may be contemplated for transactions to take place immediately via said API, or after the introduction of any delay that may be introduced by the system, such as may be desired. In an exemplary embodiment, a trusted marketplace operator may act to provide quality assurance related to collection of the data; for example, such a marketplace operator may have to actively authorize each sale or may have to authorize each sale of particular sensor output data from particular sensors, such as may be desired.

In addition to the different manners of providing marketplaces, it may be contemplated to provide different manners of providing payment for marketplace data. In an exemplary embodiment, it may be contemplated to provide payment on a per-user basis (for example, a given buyer may be able to purchase the information of one or more trusted sellers from a personal data marketplace, or may be able to purchase a number of concurrent sensor streams from a sensor data marketplace), it may be contemplated to provide payment on a per-datapoint basis (for example, it may be contemplated for trusted sellers of personal data having higher amounts of personal data for sale to be more highly remunerated, or it may be contemplated for businesses having higher amounts of data to offer for sale in a business-to-business marketplace to sell this at a higher price, and so forth), and it may be contemplated to provide payment on a per-hour basis or other subscription service (for example, it may be contemplated for buyers to purchase sensor streams on a per-hour basis, or may be contemplated for buyers to effectively "subscribe" to a certain number of trusted sellers and automatically receive any new data that they provide). Multiple combinations of such methods, for example one favored method per marketplace or one allowed method per marketplace, may likewise be contemplated; for example, it may be contemplated to have a personal data marketplace be structured as pay-per-user, may be contemplated to have a business-to-business marketplace be structured as pay-per-datapoint, and may be configured to have a sensor data marketplace be structured as pay-per-hour. Other methods of providing transactions and payment via various marketplaces may be contemplated as well.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A computer-implemented method for digital twin-based asset management, comprising:

receiving, from a user application of a user device associated with a user, a data set, the data set comprising at least one of: one or more details associated with the user received from a user interface of the user application, and one or more records associated with the user retrieved from the user device;

parsing the data set into a predetermined format, and providing the data set to a data warehouse, the data warehouse communicatively coupled to a plurality of data silos, each data silo associated with a predetermined silo topic;

sorting a first portion of data from the dataset into at least one of the plurality of data silos based on a first predetermined silo topic associated with the at least one of the plurality of data silos, and sorting a second portion of the data from the dataset into at least one other of the plurality of data silos based on a second predetermined silo topic associated with the at least one other of the plurality of data silos;

providing a plurality of personas, each of the plurality of personas associated with a predetermined persona topic, each of the plurality of personas communicatively coupled with one or more data silos in the plurality of data silos;

identifying, with at least one of the plurality of personas, from the first portion of the data and the second portion of the data, using at least one multi-dimensional clustering technique, at least one data attribute associated with the user;

constructing, from the at least one data attribute, at least one non-fungible data token (NFDT) associated with the at least one data attribute;

constructing, from the at least one data attribute and at least one other data attribute, a digital twin comprising a personal non-fungible data token (PNFDT) associated with the user;

updating a relational database to include the digital twin; and dynamically updating at least one of a data silo in the plurality of data silos or a persona in the plurality of personas based on construction of the digital twin.

2. The computer-implemented method for digital twin-based asset management of claim 1, wherein the at least one multi-dimensional clustering technique is eigenvector-based spectral clustering.

3. The computer-implemented method for digital twin-based asset management of claim 2, wherein a principal eigenvector comprising a smallest eigenvector generated from a graph including the first portion of the data and the second portion of the data provides a measure of centrality of the graph, and wherein a second smallest eigenvector is used to partition the graph into clusters.

4. The computer-implemented method for digital twin-based asset management of claim 1, wherein parsing the data set into a predetermined format comprises extracting, from each of a plurality of data strings provided in the data set, a plurality of string elements associated with a predetermined set of string element categories; and designating each of the plurality of data strings from which the plurality of string elements are extracted as uniformly consumable data prior to storing the plurality of data strings in the data warehouse.

5. The computer-implemented method for digital twin-based asset management of claim 1, further comprising, after retrieving the data set and before parsing the data set into the predetermined format, retaining the data in a data lake comprising a plurality of data sets.

6. The computer-implemented method for digital twin-based asset management of claim 5, further comprising integrating, into the data set, at least two of:

first-party input data including at least one of the one or more details associated with the user received from a user interface of the user application, first-party record data comprising the one or more records associated with the user retrieved from the user device, first-party hardware data comprising one or more hardware scan records retrieved from the user device, and at least one of second-party data and third-party-data.

7. The computer-implemented method for digital twin-based asset management of claim 6, wherein the data set includes the first-party hardware data, and wherein the first-party hardware data comprises at least one external hardware scan record of a network to which the user device is connected.

8. The computer-implemented method for digital twin-based asset management of claim 6, wherein the data set includes the first-party record data, wherein the first-party record data comprises a list of applications running on the user device, and wherein the data warehouse comprises a list of blacklisted applications.

9. The computer-implemented method for digital twin-based asset management of claim 6, wherein the data warehouse comprises a remediation action history comprising at least one previous state of the user device, comprising at least one of previous first-party record data and previous first-party hardware data, said remediation action history further comprising at least one remediation recommendation;

wherein the data set includes at least one of the first-party record data and the first-party hardware data; and wherein the method further comprises providing at least one of: a comparison of the previous first-party record data and the first-party record data, and a comparison of the previous first-party hardware data and the first-party hardware data, and determining whether the at least one remediation recommendation has been complied with.

10. The computer-implemented method for digital twin-based asset management of claim 1, further comprising:

periodically receiving, from the user application, based on a predetermined schedule, updates to the data set; and triggering updating of the digital twin based on retrieval of the updates to the data set.

11. The computer-implemented method for digital twin-based asset management of claim 1, further comprising associating, with the relational database, an alert; and triggering the alert and delivering the alert to a predetermined party upon updating of the relational database to include the digital twin.

12. The computer-implemented method for digital twin-based asset management of claim 1, further comprising:

presenting at least one of the at least one NFDT and the PNFDT to the user via the user application, and receiving a user authorization; and after receiving the user authorization, accessing a digital marketplace based on the at least one of the at least one NFDT and the PNFDT, and performing at least one transaction.

13. The computer-implemented method for digital twin-based asset management of claim 12, further comprising:

searching the digital marketplace for information associated with the at least one of the at least one NFDT and the PNFDT;

reconstructing, based on records retrieved on the digital marketplace in the at least one transaction, the at least one of the at least one NFDT and the PNFDT, and determining a reconstruction cost; and providing a report comprising the reconstruction cost to the user device.

14. The computer-implemented method for digital twin-based asset management of claim 12, further comprising:

presenting the at least one of the at least one NFDT and the PNFDT for sale on the digital marketplace;

receiving potential buyer information, and presenting, to the user, on the user interface, a request for authorization; and delaying the transaction until authorization is received.

15. The computer-implemented method for digital twin-based asset management of claim 1, further comprising providing, in association with the PNFDT, a plurality of NFDTs sorted into a plurality of categories, each NFDT in the plurality of NFDTs associated with stored category information.

16. The computer-implemented method for digital twin-based asset management of claim 15, wherein the plurality of categories includes identity characteristics, demographic information, psychographic information, geographic information, and behavioral information.

17. The computer-implemented method for digital twin-based asset management of claim 15, further comprising storing at least one connection between the PNFDT and at least one other PNFDT maintained in the relational database and associated with at least one other user.

18. The computer-implemented method for digital twin-based asset management of claim 1, wherein the one or more details associated with the user received from a user interface of the user application include: an indication of a hazard provided by the user and a location of the hazard provided by the user; and wherein the method further comprises presenting, on a map supplied to the user interface, the indication and location of the hazard provided by the user and an indication and location of a hazard provided by at least one other user.

19. A non-transitory computer-readable medium comprising program code that, when executed, causes a server comprising a network connection and configured to communicate with a user device to carry out steps of:

receiving, from a user application of the user device associated with a user, a data set, the data set comprising at least one of: one or more details associated with the user received from a user interface of the user application, and one or more records associated with the user retrieved from the user device;

parsing the data set into a predetermined format, and providing the data set to a data warehouse, the data warehouse communicatively coupled to a plurality of data silos, each data silo associated with a predetermined silo topic;

sorting a first portion of data from the dataset into at least one of the plurality of data silos based on a first predetermined silo topic associated with the at least one of the plurality of data silos, and sorting a second portion of the data from the dataset into at least one other of the plurality of data silos based on a second predetermined silo topic associated with the at least one other of the plurality of data silos;

providing a plurality of personas, each of the plurality of personas associated with a predetermined persona topic, each of the plurality of personas communicatively coupled with one or more data silos in the plurality of data silos;

identifying, with at least one of the plurality of personas, from the first portion of the data and the second portion of the data, using at least one multi-dimensional clustering technique, at least one data attribute associated with the user;

constructing, from the at least one data attribute, at least one non-fungible data token (NFDT) associated with the at least one data attribute;

constructing, from the at least one data attribute and at least one other data attribute, a digital twin comprising a personal non-fungible data token (PNFDT) associated with the user;

updating a relational database to include the digital twin; and dynamically updating at least one of a data silo in the plurality of data silos or a persona in the plurality of personas based on construction of the digital twin.

20. A system for digital twin-based asset management, comprising a server comprising a processor, a memory, and a network connection, the server configured to communicate with a user device via the network connection to carry out steps of:

receiving, from a user application of the user device associated with a user, a data set, the data set comprising at least one of: one or more details associated with the user received from a user interface of the user application, and one or more records associated with the user retrieved from the user device;

parsing the data set into a predetermined format, and providing the data set to a data warehouse, the data warehouse communicatively coupled to a plurality of data silos, each data silo associated with a predetermined silo topic;

sorting a first portion of data from the dataset into at least one of the plurality of data silos based on a first predetermined silo topic associated with the at least one of the plurality of data silos, and sorting a second portion of the data from the dataset into at least one other of the plurality of data silos based on a second predetermined silo topic associated with the at least one other of the plurality of data silos;

providing a plurality of personas, each of the plurality of personas associated with a predetermined persona topic, each of the plurality of personas communicatively coupled with one or more data silos in the plurality of data silos;

identifying, with at least one of the plurality of personas, from the first portion of the data and the second portion of the data, using at least one multi-dimensional clustering technique, at least one data attribute associated with the user;

constructing, from the at least one data attribute, at least one non-fungible data token (NFDT) associated with the at least one data attribute;

constructing, from the at least one data attribute and at least one other data attribute, a digital twin comprising a personal non-fungible data token (PNFDT) associated with the user;

updating a relational database to include the digital twin; and dynamically updating at least one of a data silo in the plurality of data silos or a persona in the plurality of personas based on construction of the digital twin.

* * * * *